(12) United States Patent
Gustafsson

(10) Patent No.: US 8,459,117 B2
(45) Date of Patent: Jun. 11, 2013

(54) METHOD AND ENCODER

(75) Inventor: Fredrik Gustafsson, Strängnäs (SE)

(73) Assignee: Leine & Linde AB, Straengnaes (SE)

( * ) Notice: Subject to any disclaimer, the term of this patent is extended or adjusted under 35 U.S.C. 154(b) by 150 days.

(21) Appl. No.: 13/083,965

(22) Filed: Apr. 11, 2011

(65) Prior Publication Data
US 2011/0247415 A1 Oct. 13, 2011

(30) Foreign Application Priority Data
Apr. 9, 2010 (SE) ........................ 1050351

(51) Int. Cl.
*G01L 1/10* (2006.01)
(52) U.S. Cl.
USPC ................. 73/579; 73/649; 73/660

(58) Field of Classification Search
USPC ............................ 73/579, 593, 649, 650, 660
See application file for complete search history.

(56) References Cited

U.S. PATENT DOCUMENTS

| | | | | |
|---|---|---|---|---|
| 5,253,531 A * | 10/1993 | Walker et al. | ................... | 73/650 |
| 5,511,422 A * | 4/1996 | Hernandez | ...................... | 73/593 |
| 6,889,553 B2 * | 5/2005 | Robinson et al. | ............... | 73/649 |
| 6,946,649 B2 * | 9/2005 | Uenaka et al. | ........... | 250/231.13 |
| 7,791,334 B2 * | 9/2010 | Fischer | ................... | 324/207.25 |
| 8,111,065 B2 * | 2/2012 | Mehnert et al. | .......... | 324/207.25 |

FOREIGN PATENT DOCUMENTS
EP    1 480 344    11/2004

\* cited by examiner

*Primary Examiner* — J M Saint Surin
(74) *Attorney, Agent, or Firm* — Kenyon & Kenyon LLP

(57) ABSTRACT

A method and an encoder are adapted to determine one or more parameters, each parameter being related to a type of vibration for the encoder. The encoder is mounted on an axis and arranged to detect rotary movement of the axis.

10 Claims, 15 Drawing Sheets

METHOD AND ENCODER

CROSS-REFERENCE TO RELATED APPLICATIONS

The present application claims priority to Application No. 1050351-4, filed in the Kingdom of Sweden on Apr. 9, 2010, which is expressly incorporated herein in its entirety by reference thereto.

FIELD OF THE INVENTION

The present invention relates to a method and an encoder. More particularly, the present invention relates to a method and an encoder for determining at least one parameter related to a type of vibration for the encoder.

BACKGROUND

A rotary encoder is an important sensor commonly used in closed loop velocity control and positioning applications within industrial applications, for example, in plants for paper or steel making in which the rotary encoder may be arranged to detect rotary movement of a machine shaft. In general, rotary encoders include a detector part which detects rotary motion and generates a signal corresponding to the detected angular position change. Different values, such as angular velocity and number of revolutions may be derived from the signal. The rotary encoders further include a mechanism, such as a bearing, for attaching the rotary encoder to a shaft of a machine whose movement is to be detected as well as a mechanism for attaching a casing of the rotary encoder to a casing of the machine.

There are several different types of rotary encoders, for example, optoelectrical encoders as described in European Patent No. 1 480 344. This type of encoder includes an encoding disc that has an optically readable pattern. There are also other types of rotary encoders based on other measurement principles. These encoders include, for example, magnetic encoders, inductive encoders, capacitive encoder, etc.

One problem related to rotary encoders is that the rotary encoders are used in environments which cause different types of wear to the rotary encoder. Due to the wear that the rotary encoder is subjected to the overall condition of the rotary encoder degrades which in turn may lead to malfunctioning of the rotary encoder.

Another factor which may influence negatively on the overall condition of the rotary encoder is the quality of the installation of the rotary encoder, for instance, the alignment of the rotary encoder when the rotary encoder is installed in the machine.

A faulty rotary encoder could lead to unscheduled stops of machines or plants for service or replacement of parts. This is disadvantageous since it leads to costly drops in production.

It is conventional to monitor the condition of rotary encoders. The optical rotary encoder described in European Patent No. 1 480 344 includes a circuit that provides a warning signal when the optical disc of the rotary encoder is contaminated. A user is then informed that the encoder needs service. However, although beneficial, the rotary encoder described in European Patent No. 1 480 344 does not provide the user with information about the quality of the installation of the rotary encoder or about the environment in which the encoder is located.

SUMMARY

Example embodiments of the present invention provide an improved encoder and a method in an encoder for determining one or more parameters where each parameter is related to a type of vibration for the encoder.

Example embodiments of the present invention provide different expressions that describe accelerations in different directions at different points of the encoder. These expressions are used to calculate parameters related to the different types of vibration that the encoder is exposed to.

According to an example embodiment of the present invention, in a method for determining one or more parameters, each parameter is related to a type of vibration for an encoder mounted on an axis and arranged to detect rotary movement of the axis, and an element fixed at the encoder prevents the encoder from rotating with the axis. The method includes: generating one or more signals, each signal being a response to an acceleration in a direction in a point of the encoder; determining one or more frequency spectrums related to the one or more signals; fitting one or more expressions related to the one or more signals based on the one or more frequency spectrums, where each expression describes an acceleration related to the one or more direction and the one or more points of the encoder; and determining one or more parameters from the one or more expressions, where each parameter is related to a type of vibration for the encoder.

According to an example embodiment of the present invention, an encoder is arranged to determine one or more parameters, each parameters being related to a type of vibration for an encoder mounted on an axis and arranged detect rotary movement of the axis, and an element fixed at the encoder prevents the encoder from rotating with the axis. The encoder includes at least one accelerometer for generating one or more signals, each signal being a response to an acceleration in a direction in a point of the encoder. The encoder further includes a processing device for determining one or more frequency spectrums related to the one or more signals. The processing device is further configured to fit one or more expressions related to the one or more signals based on the one or more frequency spectrums, where each expression describes an acceleration related to the one or more direction and the one or more points of the encoder. The processing device is further configured for determining one or more parameters from the one or more expressions, where each parameter is related to a type of vibration for the encoder.

By determining parameters related to different types of vibration for the encoder a longer lifetime of the encoder can be achieved since the encoder can be installed with a minimum amount of vibrations.

DETAILED DESCRIPTION

Figure 1:
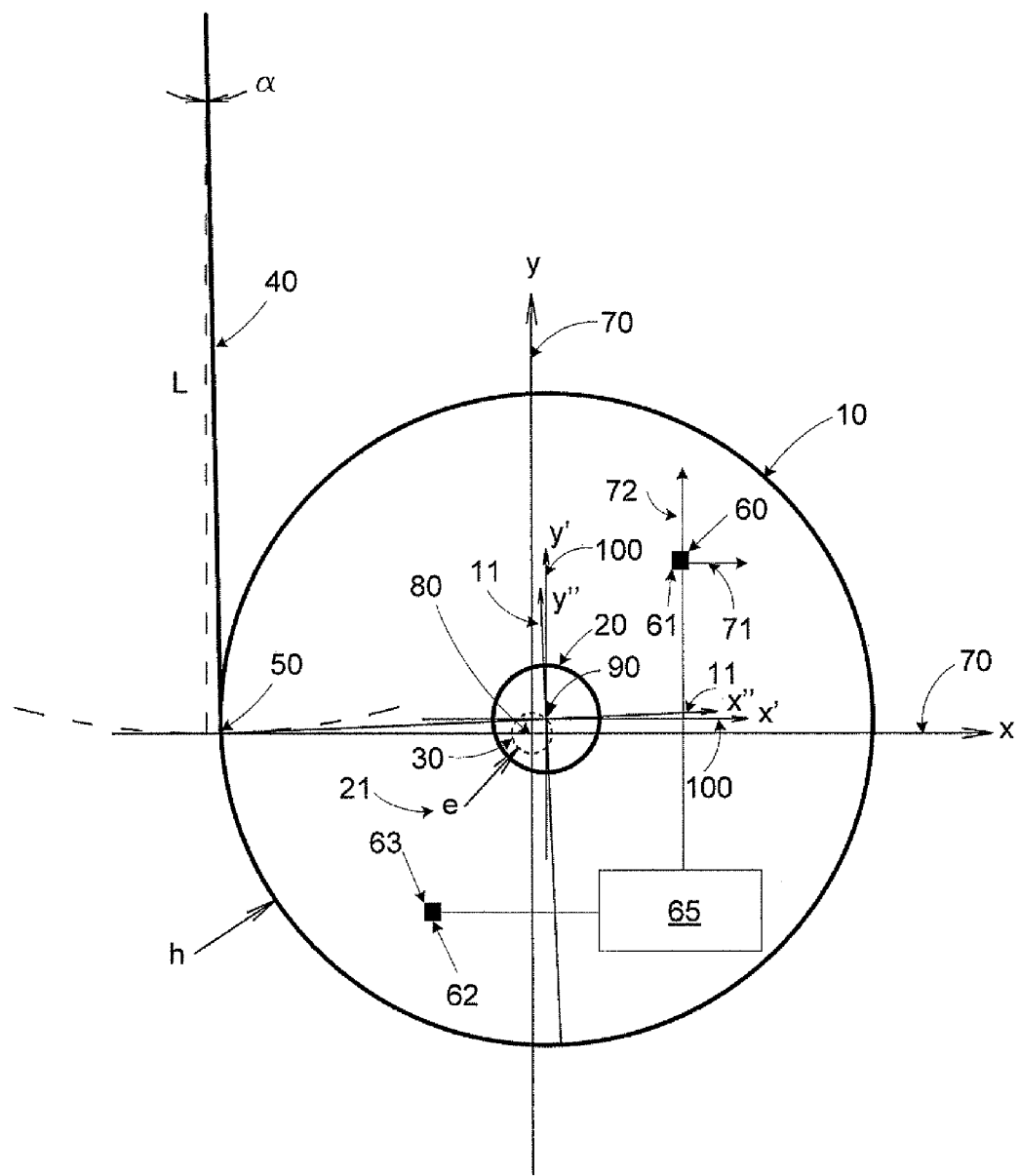
FIG. 1 schematically illustrates an encoder according to an example embodiment of the present invention.

FIG. 1 illustrates an encoder 10 for determining one or more parameters, each parameter being related to a type of vibration for the encoder 10. The encoder is mounted on an axis 20 and arranged to detect rotary movement of the axis 20.

The encoder 10 may be exposed to many different types of vibrations. One type of vibration that may arise is a vibration that occurs if the axis 20 is out of line. Another type of vibration that may arise is a vibration that occurs if the axis 20 is wobbling. Yet another type of vibration that may arise is a vibration that occurs if there is a play in an element 40 that prevents the encoder from rotating with the axis. The element 40 may, for instance, be a torque arm 40. The encoder 10 may also be exposed to a vibration that occurs from different types of impacts or vibrations from a motor. These different types of vibrations are only examples of types of vibrations to which the encoder 10 may be exposed. The encoder 10 may also be exposed to other types of vibrations. The encoder 10 may also be exposed to these different types of vibrations above simultaneously.

The different types of vibrations cause different types of wear to the encoder 10. As mentioned above, due to the wear that the encoder 10 is subjected to the overall condition of the encoder 10 degrades which in turn may lead to malfunctioning of the encoder 10. Some types of vibrations also cause measurement errors from the encoder 10.

According to example embodiments of the present invention, it is possible to find different expressions that describe accelerations in different directions at different points of the encoder 10. These expressions may be used to calculate parameters related to the different types of vibration to which the encoder is exposed. How the expressions are used to calculate the different parameters will be described in further detail below. First some examples of how different expressions are found for different possible types of vibrations to which the encoder may be exposed. These expressions are only examples of expression that can be found for accelerations at different points of the encoder 10. These expressions differ if, for instance, other parameters are used to describe a motion of the axis 20. An example of another factor that affects the expressions is which mechanism is used to prevent the encoder from rotating. For example a flexible coupling gives a different set of expressions.

In exemplary embodiments of the encoder 10, the element 40 is a torque arm 40 fixed at the encoder 10 that prevents the encoder 10 from rotating with the axis 20. In these exemplary embodiments, a length of the torque arm 40 is L. The distance from a point 50 where the torque arm 40 is fixed to a center 90 of the rotary encoder is h.

Eccentric Axis

As mentioned above one possible type of vibration that the encoder 10 may be exposed to is a vibration that arises in a case when the axis 20 is out of line. For this type of vibration, it is possible to find different expressions for accelerations at different points of the encoder 10. Below an example will be given of how expressions for accelerations in different directions at different points of the encoder may be found in a case when the axis 20 is out of line. As can be seen in FIG. 1, the axis has an eccentricity error which is e 21.

A first coordinate system (x, y) 70 in a plane parallel with the encoder 10 has its center of origin in a mean center 80 of the axis 20 during a revolution. A second coordinate system (x', y') 100 has its center of origin in the encoder 10. The encoder 10 also has its center of origin in a third coordinate system (x", y") 11 in the plane, but the third coordinate system 11 is turned so that its negative x-axis passes a point 50 where the torque arm is fixed in the encoder.

An expression which describes a position at the encoder as a function of time is sought. The expression that is sought is the expression that describes coordinates in the third coordinate system 11 expressed in coordinates in the first coordinate system 70 as a function of time t.

First a relation between the first coordinate system 70 and the second coordinate system 100 is sought. This relation may be expressed as:

$$(x,y)=(x'+e \cos \omega t, y'+e \sin \omega t); \quad (1)$$

where ω represents the angular frequency of the axis.

Figure 4:
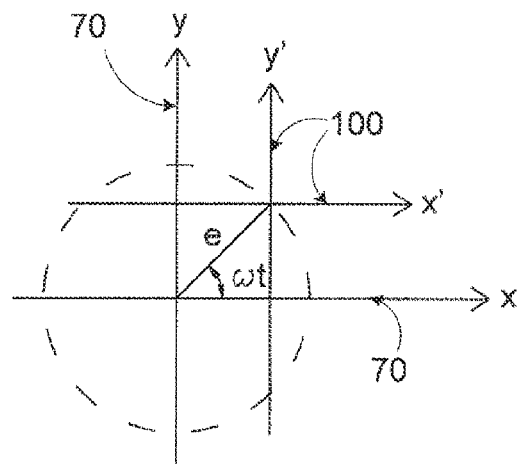
FIG. 4 illustrates a relation between a first coordinate system and a second coordinate system as a function of time.

FIG. 4 shows the relation between the first coordinate system 70 and the second coordinate system 100 as a function of time t. It is reasonable to assume that a movement of the point 50 where the torque arm 40 is fixed in the encoder 10 is linear since a (FIG. 1) can be considered to be small. FIG. 4 illustrates how the point 90 moves in a circle around the origin of center in the coordinate system 70 at radius e. Axes in the coordinate system 100 are always parallel to the axes of 70.

Figure 5:
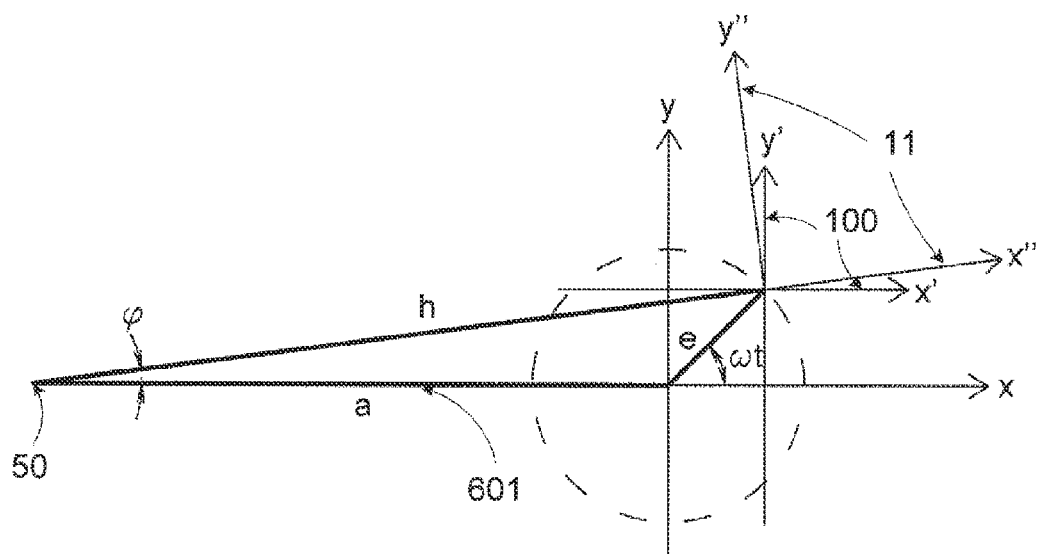
FIG. 5 illustrates a relation between a first coordinate system a second coordinate system and a third coordinate system as a function of time.

Referring to FIG. 5, it is possible to express a position in the second coordinate system 100 as a function of coordinates in the third coordinate system 11 as:

$$(x',y')=(x" \cos \phi - y" \sin \phi, x" \sin \phi + y" \cos \phi)$$

where $$\sin\varphi = \frac{e}{h}\sin\omega t \text{ and } \cos\varphi = \frac{a + e\cos\omega t}{h}$$

Actually also f can be considered to be small (e<<h), but the exact expressions are kept during the differentiation. As can be seen in FIG. 5, a is given from the cosine theorem:

$$h^2 = a^2 + e^2 - 2ae\cos(\pi - \omega t) \Rightarrow a = -e\cos\omega t + \sqrt{h^2 - e^2\sin^2\omega t}$$

which yields $$\cos\varphi = \sqrt{1 - \frac{e^2}{h^2}\sin^2\omega t}$$

and $$x = x''\sqrt{1 - \frac{e^2}{h^2}\sin^2\omega t} - y''\frac{e}{h}\sin\omega t + e\cos\omega t$$

$$y = x''\frac{e}{h}\sin\omega t + y''\sqrt{1 - \frac{e^2}{h^2}\sin^2\omega t} + e\sin\omega t$$

where (x", y") are the coordinates of a point at the accelerometer in the third coordinate system.

Figure 6:
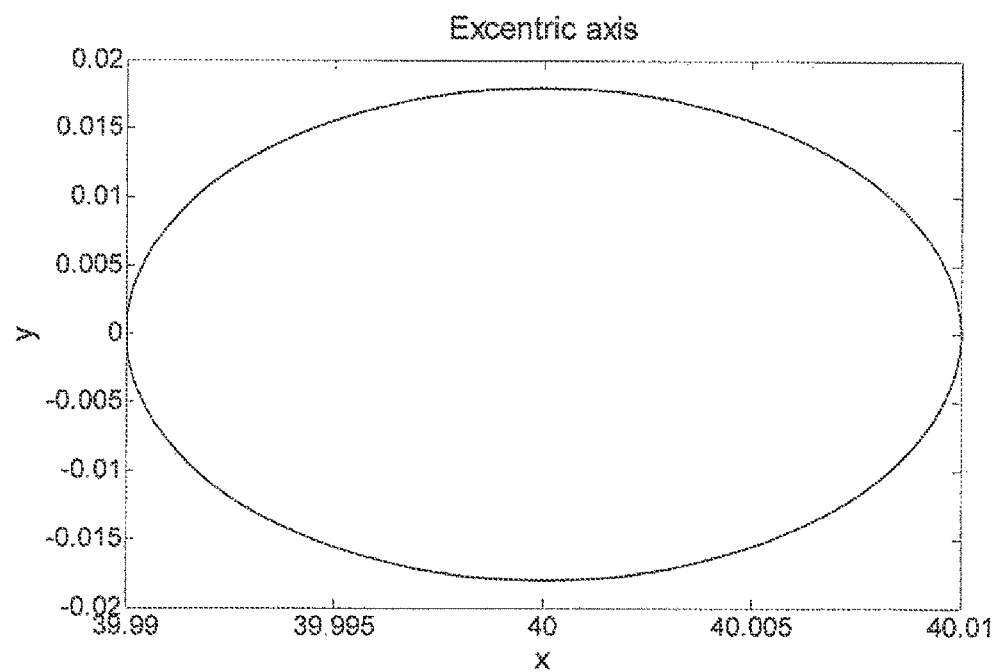
FIG. 6 shows a plot of x against y for a position at the encoder where $x''=40$, $y''=0$, $h=50$ and $e=0.01$.
Figure 7:
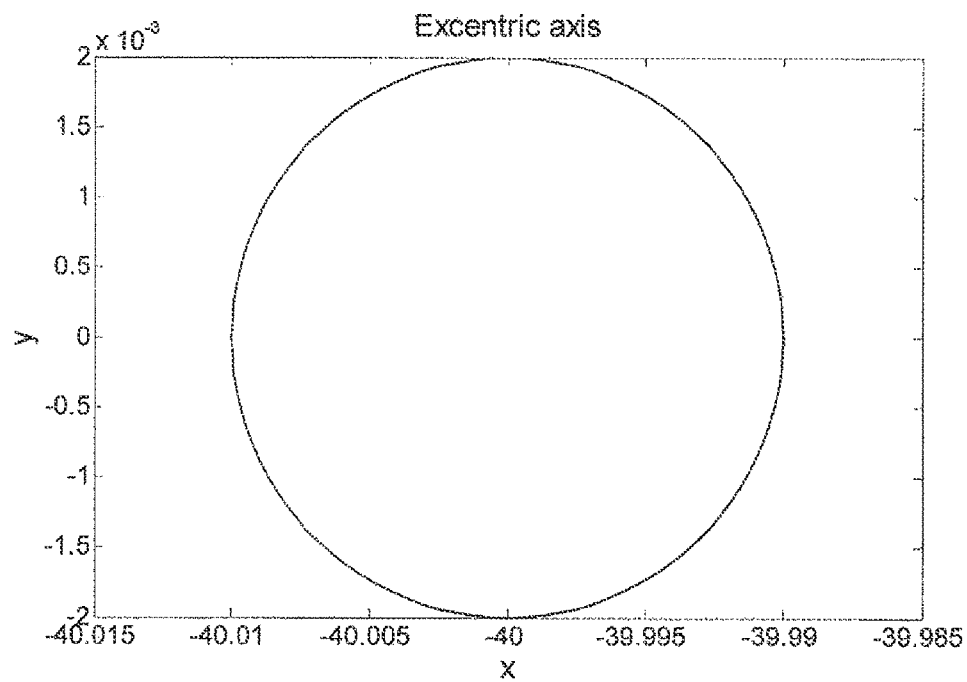
FIG. 7 shows a plot of x against y for a position at the encoder where $x''=-40$, $y''=0$, $h=50$ and $e=0.01$.
Figure 8:
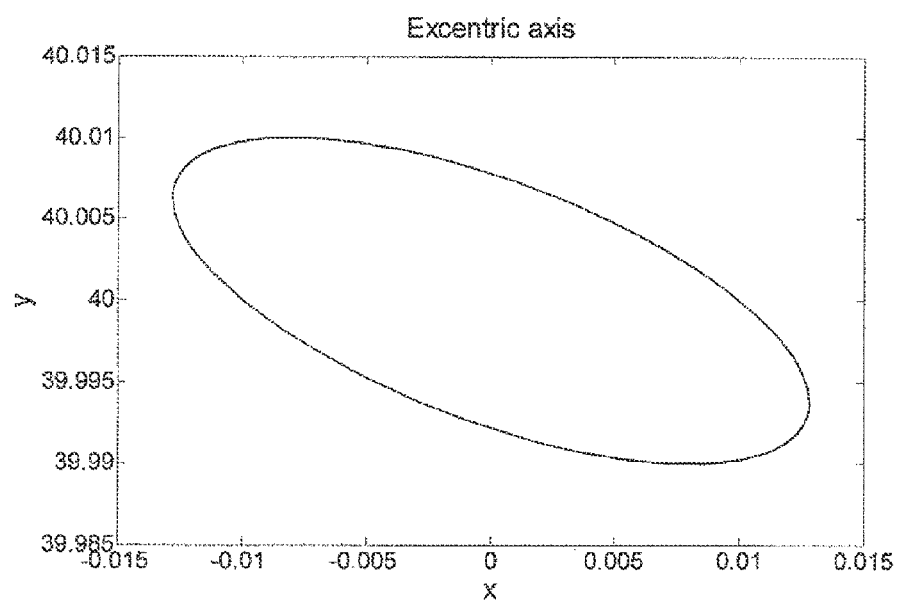
FIG. 8 shows a plot of x against y for a position at the encoder where $x''=0$, $y''=40$, $h=50$ and $e=0.01$.
Figure 9:
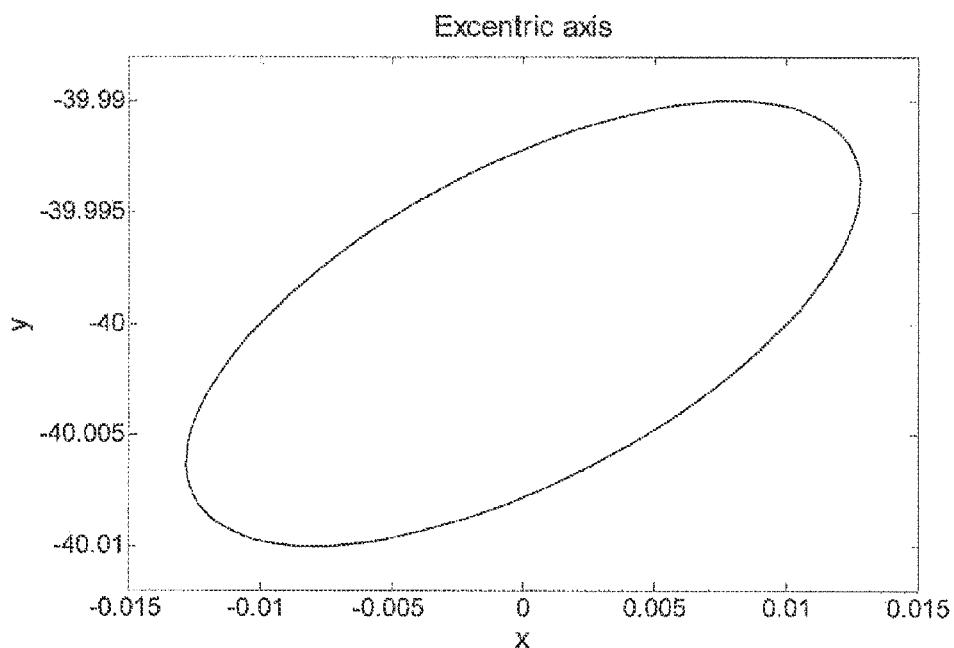
FIG. 9 shows a plot of x against y for a position at the encoder where x"=0, y"=−40, h=50 and e=0.01.

Consider a first example where x"=0 and y"=0. A plot of x against y would give a circle around origin of coordinates with the radius e. In another example x"=40, y"=0, h=50 and e=0.01. FIG. 6 illustrates this example. As can be seen in FIG. 6, a movement in this case is amplified in the y-direction. Consider yet another example where x"=−40, y"=0, h=50 and e=0.01. FIG. 7 illustrates this example. As can be seen in FIG. 7 a movement in this case is reduced in the y-direction. FIG. 8 illustrates yet another example where x"=0, y"=40, h=50 and e=0.01. Another example is illustrated in FIG. 9 where x"=0, y"=−40, h=50 and e=0.01.

An acceleration for a point at the accelerometer 60 as a function of time is given by the following:

$$\begin{cases} a_x = \frac{d^2x}{dt^2} = \\ \quad x''\left(-\frac{e^4\omega^2\sin^2 2\omega t}{4h^4}\left(1 - \frac{e^2}{h^2}\sin^2\omega t\right)^{-3/2} - \frac{e^2\omega^2\cos 2\omega t}{h^2}\right. \\ \quad \left.\left(1 - \frac{e^2}{h^2}\sin^2\omega t\right)^{-1/2}\right) + +y''\frac{e\omega^2}{h}\sin\omega t - e\omega^2\cos\omega t \\ a_y = \frac{d^2y}{dt^2} = y''\left(-\frac{e^4\omega^2\sin^2 2\omega t}{4h^4}\left(1 - \frac{e^2}{h^2}\sin^2\omega t\right)^{-3/2} - \right. \\ \quad \left.\frac{e^2\omega^2\cos 2\omega t}{h^2}\left(1 - \frac{e^2}{h^2}\sin^2\omega t\right)^{-1/2}\right) + \\ \quad -x''\frac{e\omega^2}{h}\sin\omega t - e\omega^2\cos\omega t \end{cases}$$

The expressions are unnecessarily complicated, but they can be seen as a series expansion in e/h (e/h<<1). A linear approximation in e/h gives sufficient accuracy:

$$a_x = y''\frac{e\omega^2}{h}\sin\omega t - e\omega^2\cos\omega t$$

$$a_y = -x''\frac{e\omega^2}{h}\sin\omega t - e\omega^2\sin\omega t$$

Figure 10:
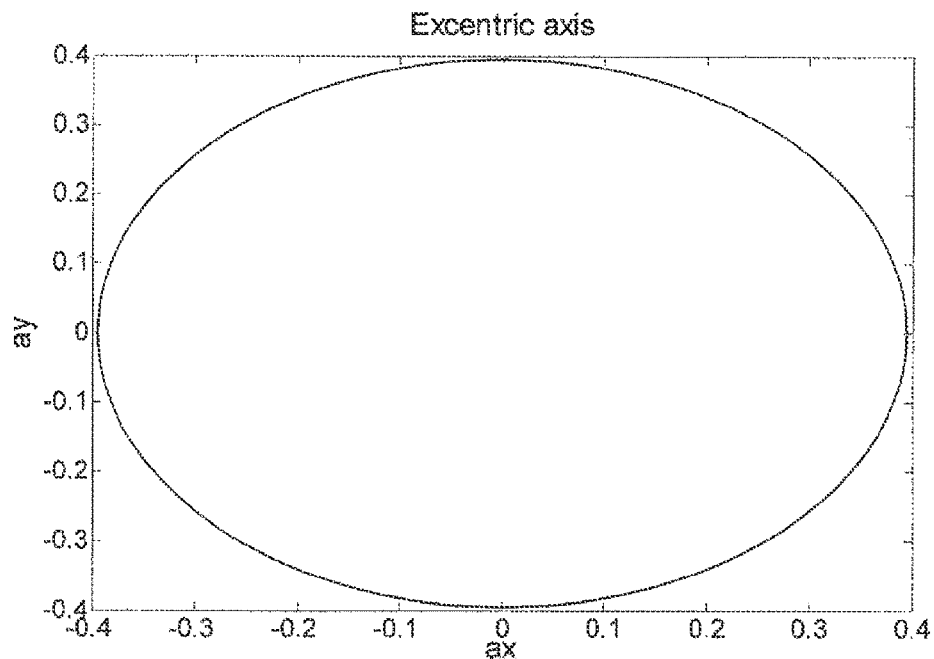
FIG. 10 shows a plot of the acceleration in the x-direction against the acceleration in the y-direction in the first coordinate system where x"=0, y"=0, h=50 and e=0.01.
Figure 11:
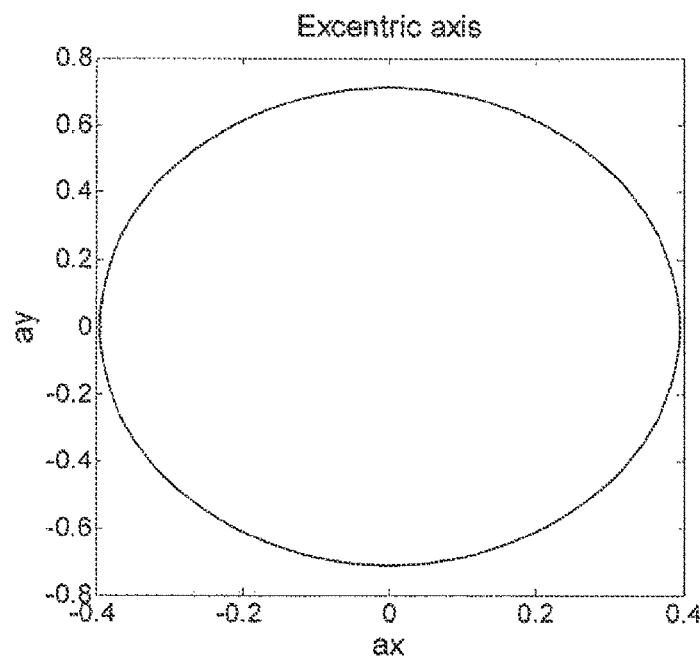
FIG. 11 shows a plot of the acceleration in the x-direction against the acceleration in the y-direction in the first coordinate system where x"=40, y"=0, h=50 and e=0.01.
Figure 12:
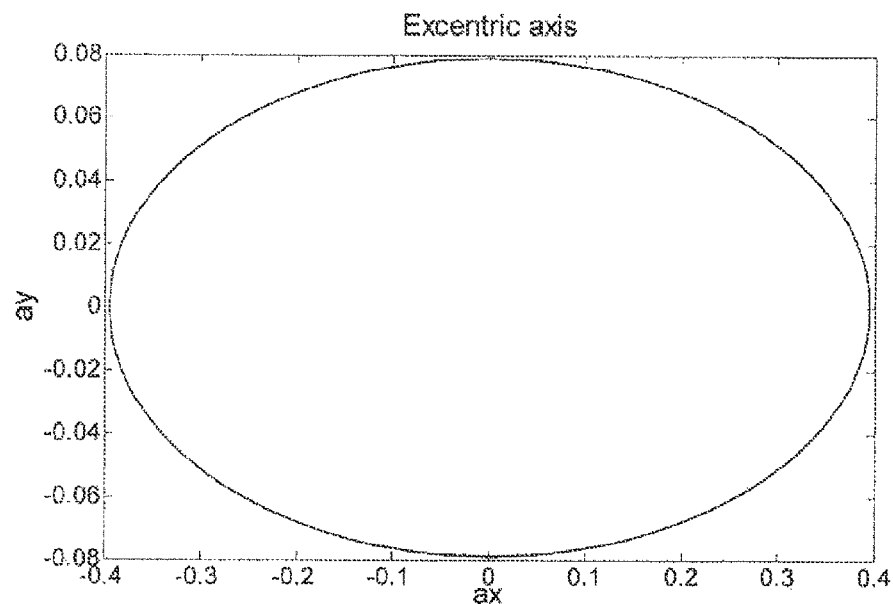
FIG. 12 shows a plot of the acceleration in the x-direction against the acceleration in the y-direction in the first coordinate system where x"=−40, y"=0, h=50 and e=0.01.

Consider an example where x"=0, y"=0, e=0.01 and h=50. In this example, w=2*p rad/s. A plot of the acceleration in the x-direction and the acceleration in the y-direction in the first coordinate system is shown in FIG. 10. Another example where x"=40, y"=0, h=50 and e=0.01 is illustrated in FIG. 11. As can be seen in FIG. 11, a movement in this case is enhanced in the y-direction. FIG. 12 illustrates yet another example where x"=−40, y"=0, h=50 and e=0.01.

Figure 13:
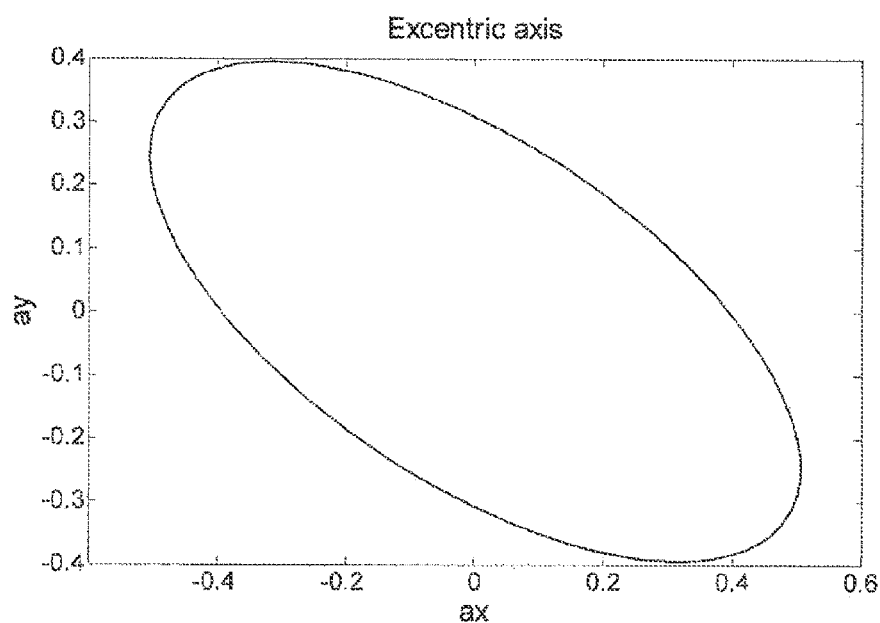
FIG. 13 shows a plot of the acceleration in the x-direction against the acceleration in the y-direction in the first coordinate system where x"=0, y"=40, h=50 and e=0.01.
Figure 14:
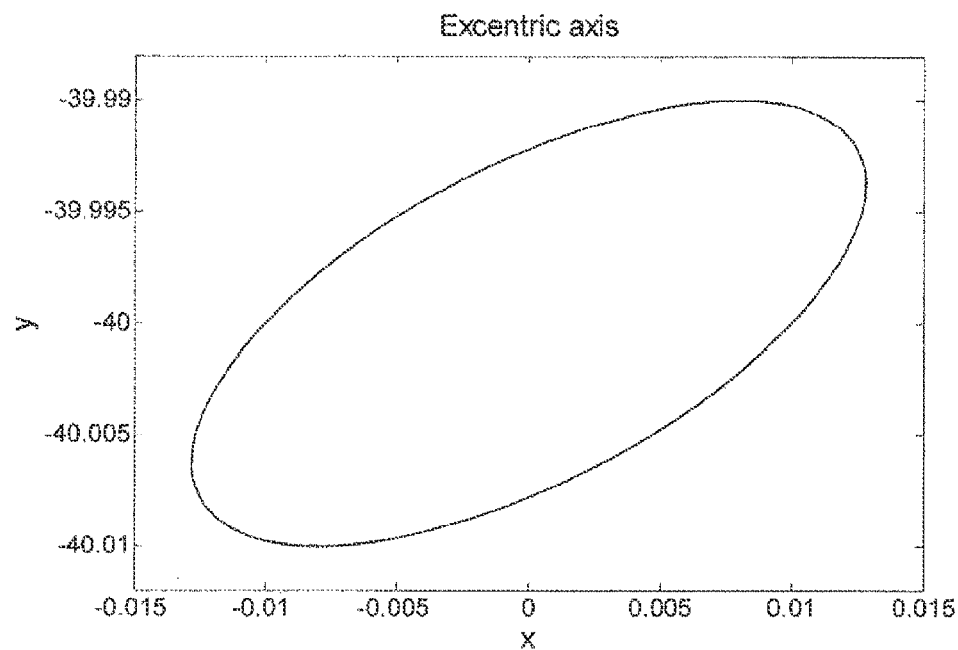
FIG. 14 shows a plot of the acceleration in the x-direction against the acceleration in the y-direction in the first coordinate system where x"=0, y"=−40, h=50 and e=0.01.

As can be seen in FIG. 12, a movement in this case is damped in the y-direction. FIG. 13 illustrates yet another example where x"=0, y"=40, h=50 and e=0.01. Yet another example is illustrated in FIG. 14 where x"=0, y"=−40, h=50 and e=0.01.

Measurement Errors of the Encoder as a Function of Time

The error in the measurement of the encoder is the angle f and is given from:

$$\sin\varphi = \frac{e}{h}\sin\omega t \Rightarrow \varphi \approx \frac{e}{h}\sin\omega t$$

Figure 15:
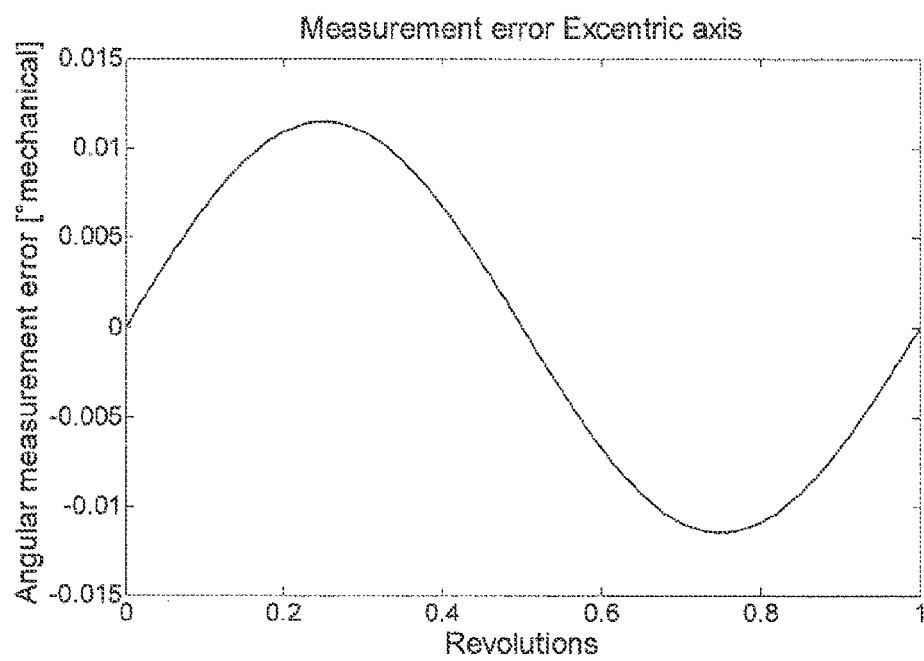
FIG. 15 shows a graph illustrating the measurement error of an encoder mounted on an eccentric axis with e=0.01 and h=50.

FIG. 15 shows a graph illustrating the measurement error of the encoder. The curve is approximately harmonic with one period per revolution. An amplitude of the curve is approximately e/h*180/π in mechanical degrees. In an example with e=0.01 and h=50, the amplitude will be 0.012° and for a rotary encoder with a resolution of 5,000 pulses per revolution (ppr) it corresponds to 60 electrical degrees (° el), i.e., one 6th of a period.

A Wobbling Axis

Another possible type of vibration that the encoder may be exposed to is a vibration that arises in a case when the axis 20 is wobbling. For this type of vibration it is possible to find other expressions for accelerations at different points of the encoder 10. An example of how expressions may be found for accelerations, in different directions at different points of the encoder in a case when the axis 20 is wobbling is given below.

Position as a Function of Time for a Wobbling Axis

Figure 16:
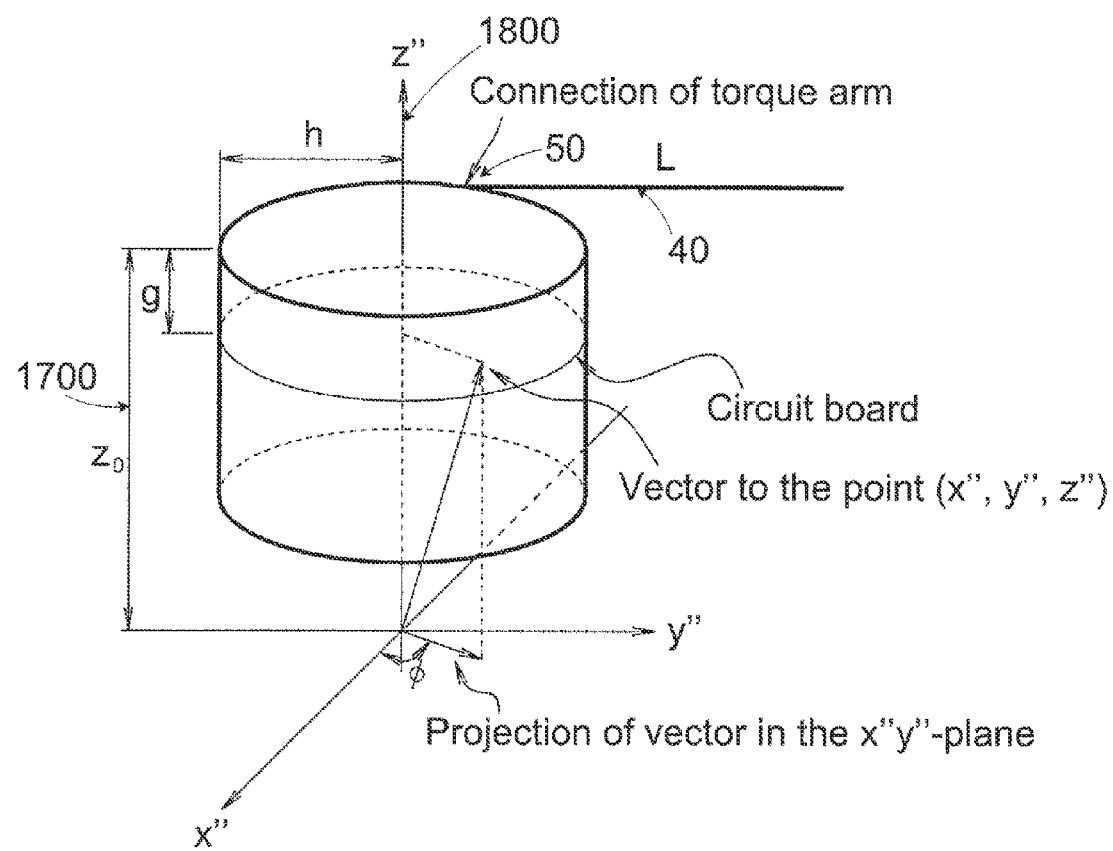
FIG. 16 illustrates the symmetry axis y" 1800 of the encoder.
Figure 17:
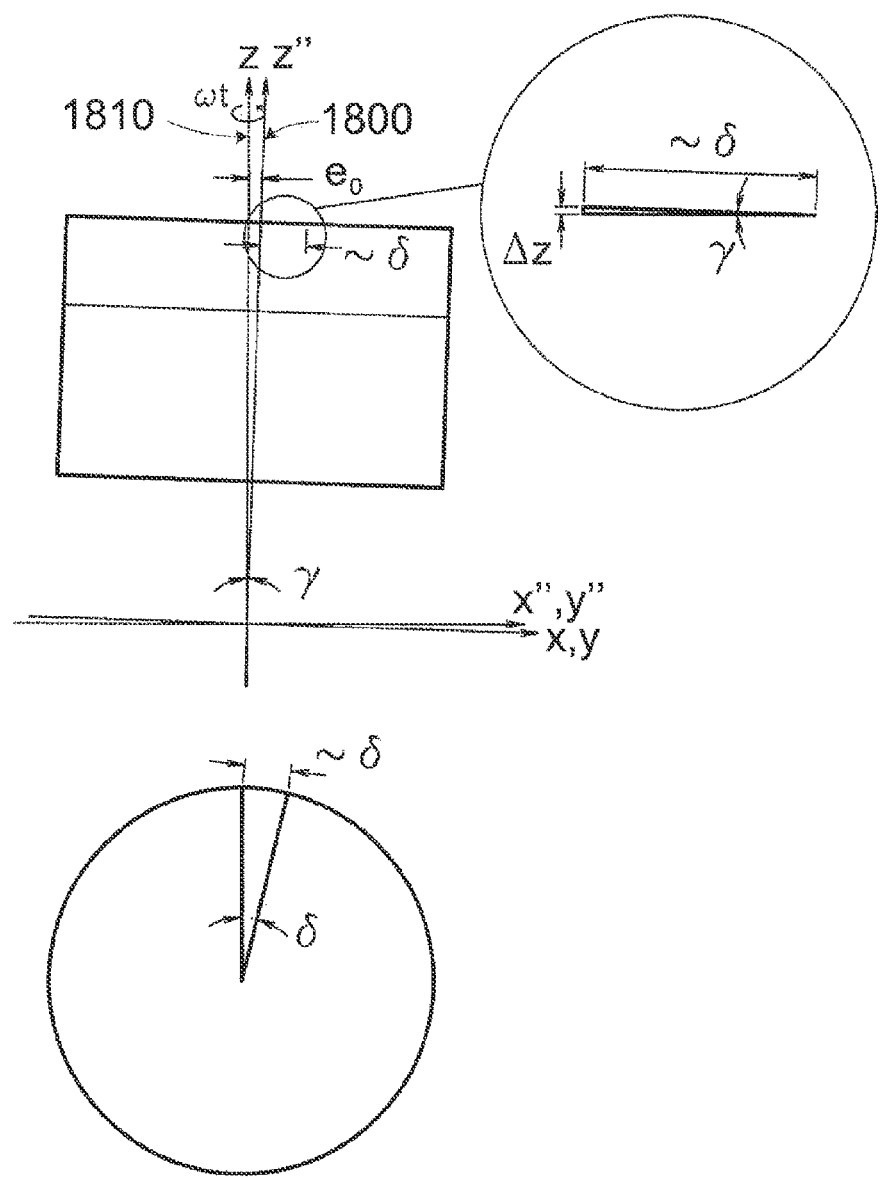
FIG. 17 illustrates a wobbling motion of the encoder when the symmetry axis y" 1800 of the encoder is not parallel with the symmetry axis y 1810 of the rotation.

Referring to FIG. 16, the wobbling is created if the symmetry axis y" 1800 of the encoder is not parallel with the symmetry axis y 1810 of the rotation (see FIG. 17). The motion of the encoder 10 is three dimensional and rather complex, therefore some simplifications are made.

First it is considered that the movement of the point 50 where the torque arm 40 is fixed in the encoder can be considered to be linear analogously to a being small in the eccentric axis case.

In the z-direction, the turning in the x"y"-plane is disregarded. This turning corresponds to the error in the angular measurement. If the encoder is doing a wobbling motion without rotating around its own axis, an arbitrary point in the encoder, will move in the z-direction according to:

$$\Delta z \approx \gamma\sqrt{(x'')^2 + (y'')^2}X(t) \propto \gamma, \gamma<<1, X \text{ is an unspecified function of time;}$$

The dominating contribution to the motion is thus linear in γ, the angle between the axis 1810 and the encoder 1800 of FIG. 17. Note that the motion is independent from the value of z". It is possible to show that the turning in the x"y"-plane that was neglected above contributes with a second order term in y, which is the reason it can be considered small. Intuitively it can be viewed in the following manner, with the help of FIG. 17. Let the encoder rotate a small angle δ, caused by the small angle φ. The distance that a point in the encoder will move is proportional to δ and in the z-direction the movement will be proportional to γδ, which is much smaller than γ. Δz∝γδ<<γ

By forming thin layers of the encoder at different positions in the z-direction and then look at the layers separately the problem is reduced from one problem in three dimensions to a multiple of problems in two dimensions. The idea is to start in the layer where the torque arm 40 is fixed. In this layer or plane z is equal to $z_0$ 1700. For the motion in the plane where $z=z_0$ one can make the simplification that the x", y"-plane is parallel with the x, y-plane and that the z"-axis is parallel with the z-axis but out of line with the eccentricity $e_0=e(z_0)$. The results from the case with an eccentric axis can then be used. For an arbitrary layer it is valid that the eccentricity is $$e = e_0 \frac{z}{z_0}.$$

Figure 18:
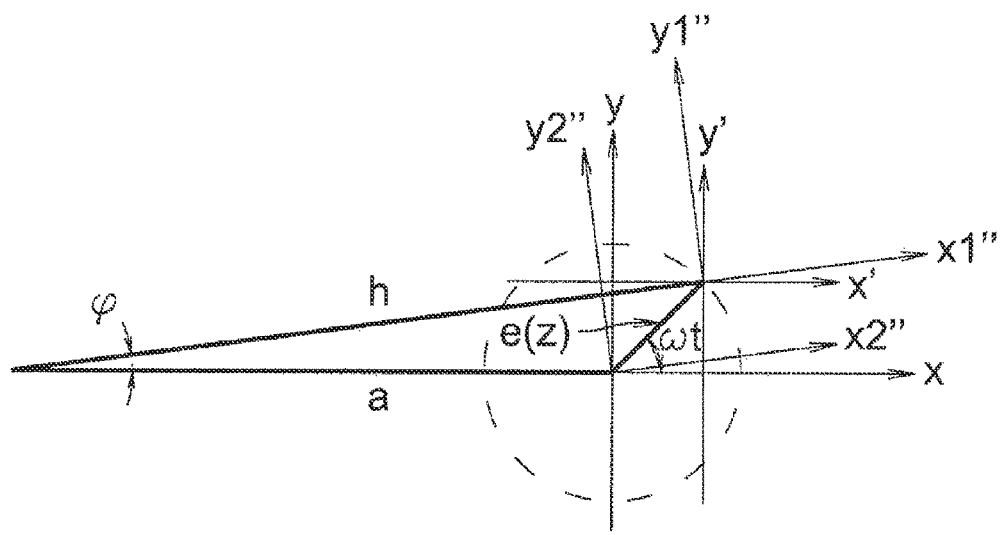
FIG. 18 illustrates two layers, z=$z_0$ and z=0, with the coordinate systems x1", y1" and x2", y2".

This means that the terms in the equations of motion corresponding to a translation should be scaled in a corresponding manner. Those terms are the ones that do not contain the variables x" or y". We call them φ-independent. FIG. 18 illustrates two layers, $z=z_0$ and $z=0$, with the coordinate systems x1"y1" resp. x2"y2". The angle φ is the same for the two layers, since the encoder is rigid. This means that the φ-dependent terms of the equations of motion, i.e. those containing x" or y", should not be scaled at all.

An interesting plane is the plane where a circuit board is located, $z=z_0-g$. In this plane it is possible to express the coordinates of a point in an arbitrary z-plane as a function of time.

The coordinates may be expressed as:

$$x = x'' - y'' \frac{e_0}{h} \sin\omega t + \frac{z_0 - g}{z_0} e_0 \cos\omega t$$

$$y = x'' \frac{e_0}{h} \sin\omega t + y'' + \frac{z_0 - g}{z_0} e_0 \sin\omega t$$

$$z = z_0 - g - \frac{e_0}{z_0} \cos(\omega t + \phi)\sqrt{(x'')^2 + (y'')^2}$$

The expression for z is given from FIG. 17 and also that ωt=0 when a projection of a rotation axis in the xy-plane coincides with the x-axis (See FIG. 18, where e(z) is that projection). The angle φ is also found in FIG. 16 and only affects "a phase" for the motion (in relation to phases for x- and y-coordinates).

Figure 19:
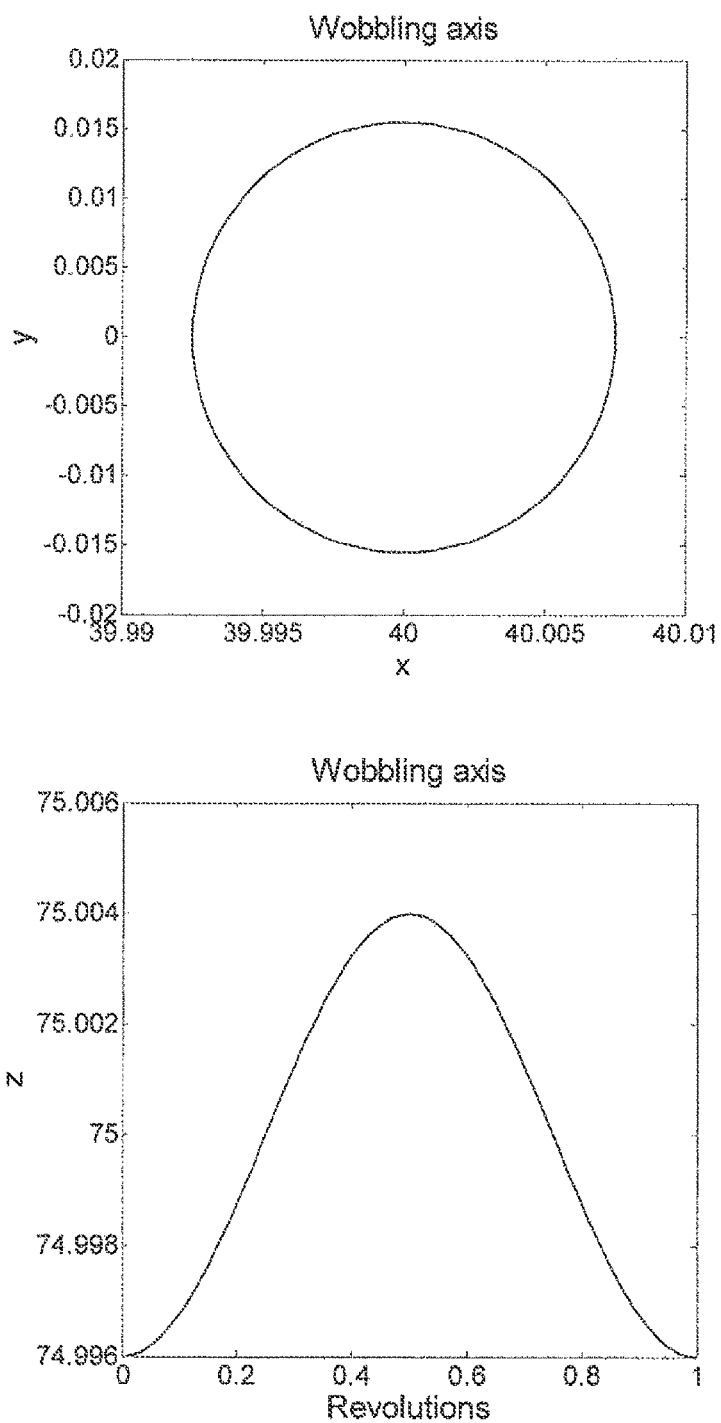
FIG. 19 illustrates a plot of motions in the x-direction against the y-direction and in the z-direction during one revolution where x"=40, y"=0, g=25, h=50, $e_0$=0.01 and $z_0$=100.

Consider an example where h=50, $e_0$=0.01 and $z_0$=100. In this example x"=40, y"=0 and g=25. A plot of motions in the x-direction, the y-direction and in the z-direction for this example is shown in FIG. 19.

The accelerations in x, y and z-directions are given from a second derivative of the expression for the positions.

$$a_x = \frac{d^2 x}{dt^2} = y'' \frac{e_0 \omega^2}{h} \sin\omega t - \frac{z_0 - g}{z_0} e_0 \omega^2 \cos\omega t$$

$$a_y = \frac{d^2 y}{dt^2} = -x'' \frac{e_0 \omega^2}{h} \sin\omega t - \frac{z_0 - g}{z_0} e_0 \omega^2 \sin\omega t$$

$$a_z = \frac{d^2 z}{dt^2} = \frac{e_0 \omega^2}{z_0} \cos(\omega t + \phi)\sqrt{(x'')^2 + (y'')^2}$$

Note that as $z_0$ grows large the expressions above become the same as in the case with an eccentric axis without wobble.

Figure 20:
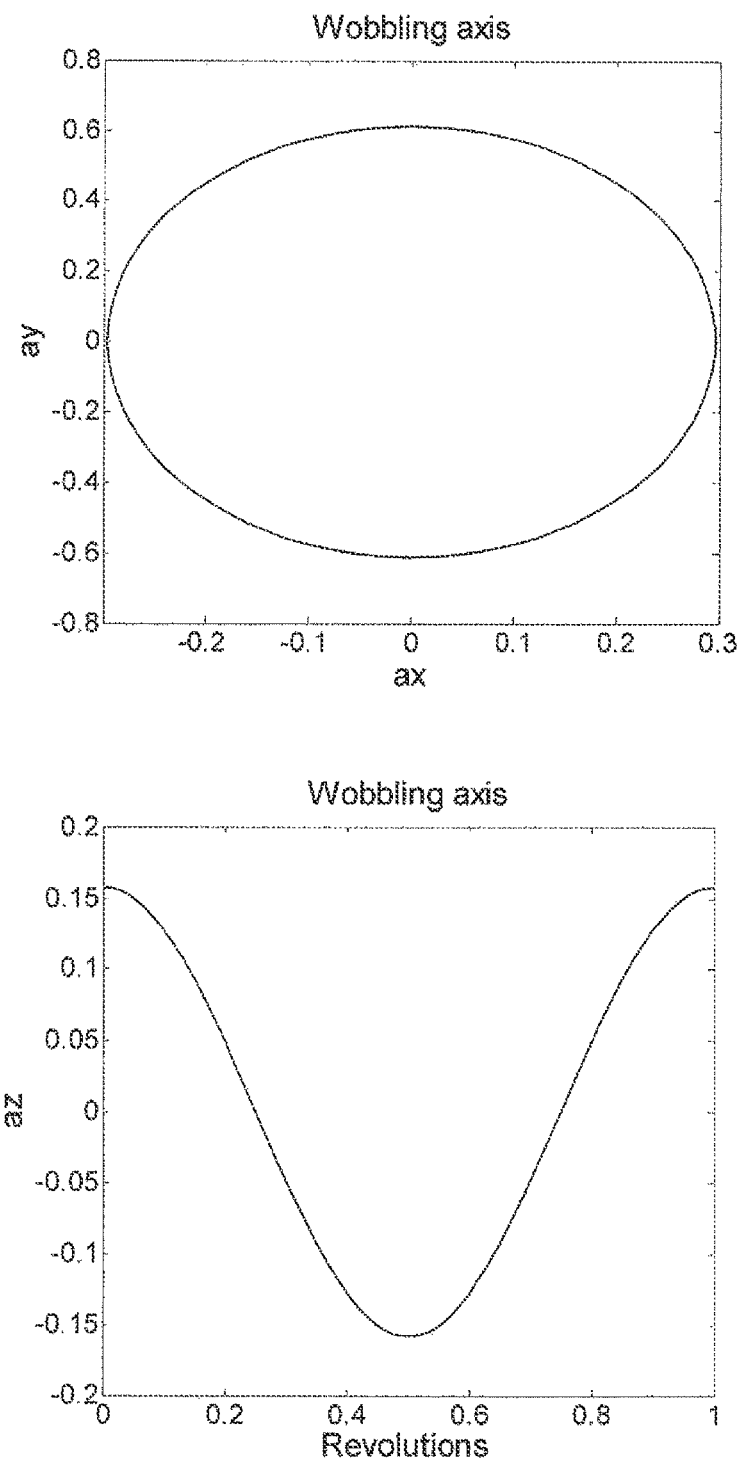
FIG. 20 illustrates a plot of accelerations in the x-direction against the y-direction and in the z-direction during one revolution where x"=40, y"=0, g=25, h=50, $e_0$=0.01 and $z_0$=100.

Consider an example where h=50, $e_0$=0.01 and $z_0$=100. In this example x"=40, y"=0 and g=25. A plot of accelerations in the x-direction, y-direction and in the z-direction are shown for this example in FIG. 20.

Figure 21:
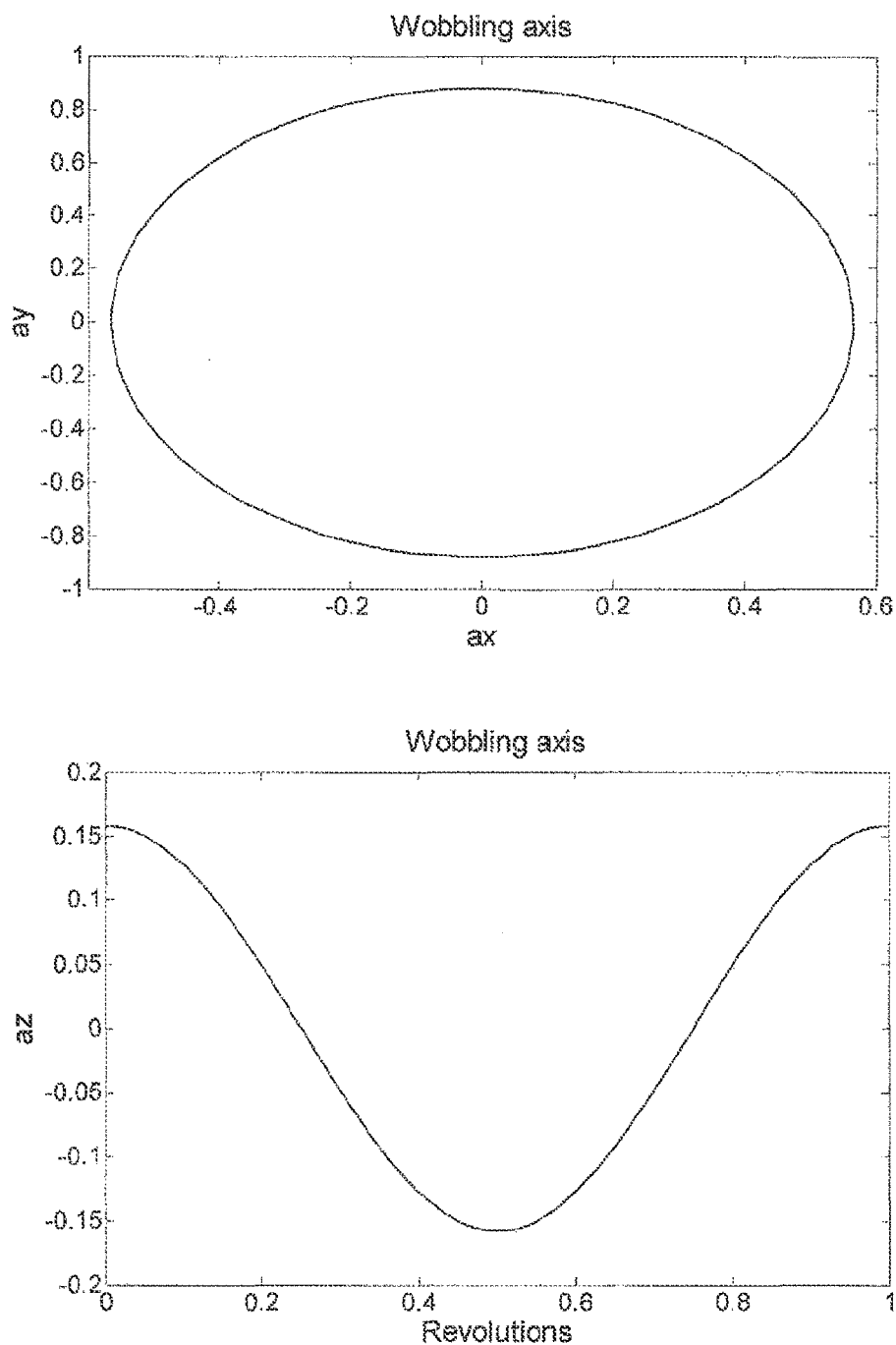
FIG. 21 illustrates a plot of accelerations in the x-direction against the y-direction and in the z-direction during one revolution where h=50, $e_0$=0.01, $Z_0$=100, x"=40, y"=0 and g=−43.

In another example h=50, $e_0$=0.01, $Z_0$=100, x"=40, y"=0 and g=−43. A plot of accelerations in the x-direction, in the y-direction and in the z-direction for this example is shown in FIG. 21.

The error in angular measurement as a function of time is similar to before $$\sin\varphi = \frac{e_0}{h} \sin\omega t \Rightarrow \varphi \approx \frac{e_0}{h} \sin\omega t$$

Direct Acceleration

Yet another possible type of vibration that the encoder may be exposed to is a vibration that arises from different types of impacts or vibrations from a motor. For this type of vibration it is possible to find other expressions for accelerations at different points of the encoder 10. An example of how expressions for accelerations, in different directions at different points of the encoder, is given below.

To the theoretical accelerations that the encoder may be exposed to because of for instance an eccentric axis or a wobbling axis may thus other accelerations be added. We denominate those other accelerations direct accelerations $\bar{s}(t)$. The expressions for the accelerations in the different directions may be written as:

$$\begin{cases} a_x = y'' \frac{e_0 \omega^2}{h} \sin\omega t - (e_0 - \gamma g)\omega^2 \cos\omega t + s_x(t) \\ a_y = -x'' \frac{e_0 \omega^2}{h} \sin\omega t - (e_0 - \gamma g)\omega^2 \sin\omega t + s_y(t) \\ a_z = \gamma \omega^2 \cos(\omega t + \phi)\sqrt{(x'')^2 + (y'')^2} + s_z(t) \end{cases} \quad (9)$$

Where the quantity $$\frac{e_0}{z_0}$$

has been replaced by γ.

As mentioned above it is, according to example embodiments of the present invention, possible to determine different parameters related to the different types of vibrations to which the encoder 10 may be exposed.

Parameters that may be of interest to determine with example embodiments of the present invention are, for instance, run out 2*$e_0$ and an angle of the axis $$\gamma = \frac{e_0}{z_0}.$$

Referring back to FIG. 1, which shows an exemplary embodiments of the encoder 10, the encoder 10 includes at least one accelerometer 61, 62 for generating one or more signals $si_1, si_2, \ldots, si_n$, each signal $si_1, si_2, \ldots, si_n$ being a response to acceleration in a direction in a point 60, 63 of the encoder 10.

First are exemplary embodiments of the encoder 10 that include one accelerometer 61 that measures acceleration in one direction described. In these exemplary embodiments of the encoder 10, the accelerometer 61 generates one signal $si_1$ which is a response to acceleration in one direction in a point 60 of the encoder 10. The accelerations in the x, y and z-directions can be described using equation (9). In these exemplary embodiments of the encoder 10 it is assumed that the direct acceleration $s_1$ for the axis 20 is not harmonic with one period per revolution.

Note that the accelerations in the x- and y-directions mostly depend on $e_0$ and $\gamma$, and that the z-direction mostly depends on $\gamma$. The accelerations that are generated from an eccentric axis 20 or a wobbling axis 20 are also harmonic with one period per revolution of the axis 20. In exemplary embodiments of the encoder 10, $e_0$ and $\gamma$ are used to describe a motion of the axis 20. When using $e_0$ and $\gamma$ to describe the motion of the axis 20 it is advantageous to measure the acceleration in the x-y-plane or in the z-direction. If other parameters are used to describe the motion of the axis 20, it may be provided to measure the acceleration in other directions. Thus, measurement of acceleration in the x-y-plane or in the z-direction should not be considered limiting. Rather, directions only constitute exemplary embodiments of the encoder 10.

Examples of how $e_0$ and $\gamma$ may be calculated in exemplary embodiments where a single accelerometer 60 is used are described below. The parameters $\alpha_1$, $\alpha_2$, and $\alpha_3$ are scale factors used to express the acceleration in the actual direction of measurement in the coordinates of the coordinate system 11. The expression for an acceleration $\alpha_1$ can be written as:

$$a_1 = \alpha_1 a_x(e_0, \gamma, t) + \alpha_2 a_y(e_0, \gamma, t) + \alpha_3 a_z(\gamma, t) + s_1(t)$$

Assume that $\gamma$ is approximately zero. If $\gamma$ can not be considered small the acceleration should instead be measured in the z-direction. The acceleration can be expressed as:

$$a_1 = \alpha_1 a_x + \alpha_2 a_y + s_1 \Rightarrow a_1 = e_0 k \sin(\omega t + \delta) + s_1 \quad (100)$$

where $$\tan\delta = \frac{k_2}{k_1}$$

Assume that the direct acceleration $s_1$ is not harmonic with one cycle per revolution for the axis 20.

The encoder 10 includes a processing device 65 which receives the signal $si_1$. The processing device 65 is configured to determine a frequency spectrum $F_{si1}$ related to the signal $si_1$. The processing device 65 is configured to fit the sinus term in the expression 100 to the frequency spectrum $F_{si1}$ for the signal $si_1$. An amplitude $A_m$ for a frequency component $F_r$ in the frequency spectrum $F_{si1}$ which corresponds to the first harmonic for the axis 20 is determined by the processing device 65. The processing device 65 then fits the sinus term in the expression 100 to the signal $si_1$ based on the amplitude for the frequency component $F_r$ in the frequency spectrum $F_{si1}$. The processing device 65 thereby determines $e_0$ as:

$$e_0 = \frac{1}{k} A m \quad (101)$$

The direct acceleration may then be determined by the processing device 65 as:

$$s_1 = si_1 - e_0 k \sin(\omega t + \delta)$$

In other exemplary embodiments of the encoder 10, the accelerometer 61 instead measures the acceleration in the z-direction. In these exemplary embodiments of the encoder 10, $\alpha_1$ and $\alpha_2$ are close to zero and $\alpha_3$ is close to 1. The acceleration $\alpha_1$ may be expressed as:

$$a_1 = \alpha_3 a_z + s_1 = \alpha_3 \gamma \omega^2 \cos(\omega t + \phi) \sqrt{x''^2 + y''^2} + s_1 = \gamma k \cos(\omega t + \phi) + s_1 \quad (102)$$

where k is a known constant.

Assume that the direct acceleration $s_1$ is not harmonic with one period per revolution for the axis 20. In these exemplary embodiments, the processing device 65 also determines a frequency spectrum $F_{si1}$ related to the signal $si_1$. An amplitude $A_m$ for a frequency component $F_r$, which corresponds to a cycle of once per revolution, in the frequency spectrum $F_{si1}$ is determined by the processing device 65. The processing device 65 then fits the co sinus term in the expression 102 to the signal $si_1$ based on the amplitude $A_m$. The processing device 65 thereby determines $\gamma$ as:

$$\gamma = \frac{1}{k} A m \quad (103)$$

The direct acceleration may then be determined by the processing device 65 as:

$$s_1 = si_1 - \gamma k \cos(\omega t + \phi)$$

Exemplary embodiments of the encoder 10, that include one accelerometer 61 that measures acceleration $a_1$ and $a_2$ in two directions, will be described. In these exemplary embodiments of the encoder 10, the accelerometer 61 generates two signals $si_1$ and $si_2$ which are responses to accelerations $a_1$ and $a_2$ in two directions in the point 60 of the encoder 10. The accelerations $a_1$ and $a_2$ can be written as:

$$\begin{cases} a_1 = \alpha_1 a_x(e_0, \gamma, t) + \alpha_2 a_y(e_0, \gamma, t) + \alpha_3 a_z(\gamma, t) + s_1(t) \\ a_2 = \alpha_4 a_x(e_0, \gamma, t) + \alpha_5 a_y(e_0, \gamma, t) + \alpha_6 a_z(\gamma, t) + s_2(t) \end{cases} \Rightarrow \quad (104, 105)$$

$$\begin{cases} a_1 = (e_0 c_1 + \gamma c_2)\sin\omega t + (e_0 c_2 + \gamma c_4)\cos\omega t + \gamma c_5 \cos(\omega t + \phi) + s_1 \\ a_2 = (e_0 c_6 + \gamma c_7)\sin\omega t + (e_0 c_8 + \gamma c_9)\cos\omega t + \gamma c_{10}\cos(\omega t + \phi) + s_2 \end{cases} \Rightarrow$$

$$\begin{cases} a_1 = k_1 \sin(\omega t + \delta_1) + s_1 \\ a_2 = k_2 \sin(\omega t + \delta_2) + s_2 \end{cases}$$

where $c_1, c_2, \ldots c_{10}$ are known constants and $k_1, k_2, \delta_1$ and $\delta_2$ are known functions of $e_0$ and $\gamma$. In these exemplary embodiments, the processing device 65 is configured to determine frequency spectrums $F_{si1}$ and $F_{si2}$ related to each of the signals $si_1$ and $si_2$ respectively.

The processing device 65 fits the sinus term in the expressions 104 and 105 to the first harmonic of the signal $si_1$ and $si_2$ respectively, based on the frequency spectrums for the signals. Amplitudes $Am_1$ and $Am_2$ for frequency components in the frequency spectrums $F_{si1}$ and $F_{si2}$, which corresponds to the first harmonic for the axis 20 is determined for $si_1$ and $si_2$ by the processing device 65. The processing device 65 thereby determines $e_0$ and $\gamma$ by solving the equation system:

$$\begin{cases} k_1(e_0, \gamma) = Am_1 \\ k_2(e_0, \gamma) = Am_2 \end{cases}$$

The direct accelerations $s_1$ and $s_2$ may be considered as remaining parts of the signals $si_1$ and $si_2$. The direct accelerations $s_1$ and $s_2$ can be determined by the processing device 65 as:

$$\begin{cases} s_1 = si_1 - k_1 \sin(\omega t + \delta_1) \\ s_2 = si_2 - k_2 \sin(\omega t + \delta_2) \end{cases}$$

Other exemplary embodiments of the encoder 10 include one accelerometer 61 that measures acceleration $a_1$, $a_2$ and $a_3$ in three directions. In these exemplary embodiments of the encoder 10, the accelerometer 61 generates three signals $si_1$, $si_2$, and $si_3$ which are responses to accelerations $a_1$, $a_2$ and $a_3$ in three directions in the point 60 of the encoder 10. The accelerations $a_1$, $a_2$ and $a_3$ may be written as:

$$\begin{cases} a_1 = \alpha_1 a_x(e_0, \gamma, t) + \alpha_2 a_y(e_0, \gamma, t) + \\ \quad \alpha_3 a_z(\gamma, t) + s_1(t) \\ a_2 = \alpha_4 a_x(e_0, \gamma, t) + \alpha_5 a_y(e_0, \gamma, t) + \\ \quad \alpha_6 a_z(\gamma, t) + s_2(t) \\ a_3 = \alpha_5 a_x(e_0, \gamma, t) + \alpha_8 a_y(e_0, \gamma, t) + \\ \quad \alpha_9 a_z(\gamma, t) + s_3(t) \end{cases} \Rightarrow \quad (106, 107, 108)$$

$$\begin{cases} a_1 = (e_0 c_1 + \gamma c_2)\sin\omega t + (e_0 c_2 + \\ \quad \gamma c_4)\cos\omega t + \gamma c_5 \cos(\omega t + \phi) + s_1 \\ a_2 = (e_0 c_6 + \gamma c_7)\sin\omega t + (e_0 c_8 + \\ \quad \gamma c_9)\cos\omega t + \gamma c_{10}\cos(\omega t + \phi) + s_2 \\ a_3 = (e_0 c_{11} + \gamma c_{12})\sin\omega t + (e_0 c_{13} + \\ \quad \gamma c_{14})\cos\omega t + \gamma c_{15}\cos(\omega t + \phi) + s_3 \end{cases} \Rightarrow$$

$$\begin{cases} a_1 = k_1 \sin(\omega t + \delta_1) + s_1 \\ a_2 = k_2 \sin(\omega t + \delta_2) + s_2 \\ a_3 = k_3 \sin(\omega t + \delta_3) + s_3 \end{cases}$$

where, $c_1, c_2, \ldots c_{15}$ are known constants and $k_1, k_2, k_3, \delta_1, \delta_2$ and $\delta_3$ are known functions of $e_0$ and $\gamma$.

In these exemplary embodiments the processing device 65 is configured to determine frequency spectrums $F_{si1}$, $F_{si2}$ and $F_{si3}$ related to each of the signals $si_1$, $si_2$ and $si_3$ respectively. The processing device 65 fits the sinus term in the expressions 106, 107 and 108 to the signals $si_1$, $si_2$ and $si_3$ respectively based on the frequency spectrums $F_{si1}$, $F_{si2}$ and $F_{si3}$ for the signals. Amplitudes $Am_1$, $Am_2$ and $Am_3$ for frequency components $F_{rsi1}$, $F_{rsi2}$ and $F_{rsi3}$ in the frequency spectrums $F_{si1}$, $F_{si2}$, and $F_{si3}$ which corresponds to the first harmonic for the axis 20 is determined $si_1$, $si_2$ and $si_3$ by the processing device 65.

The processing device 65 determines $e_0$ and $\gamma$ by finding a solution to the over determined equation system 109. The processing device may for instance use the method of least squares to find a solution to the system 109.

$$\begin{cases} k_1(e_0, \gamma) = Am_1 \\ k_2(e_0, \gamma) = Am_2 \\ k_3(e_0, \gamma) = Am_3 \end{cases} \quad (109)$$

The direct accelerations $s_1$, $s_2$ and $s_3$ may be considered as the remaining parts of the signals $si_1$, $si_2$ and $si_3$. The direct accelerations $s_1$, $s_2$ and $s_3$ can be determined by the processing device 65 as:

$$\begin{cases} s_1 = si_1 - k_1(e_0, \gamma)\sin(\omega t + \delta_1) \\ s_2 = si_2 - k_2(e_0, \gamma)\sin(\omega t + \delta_2) \\ s_3 = si_3 - k_3(e_0, \gamma)\sin(\omega t + \delta_3) \end{cases}$$

Yet other exemplary embodiments of the encoder 10 include two accelerometers 61 and 62 that each measures acceleration in one direction respectively. The accelerometer 61 measures acceleration $a_1^{(1)}$ and the accelerometer 62 measures acceleration $a_1^{(2)}$. The upper index denotes that the accelerations are measured in different positions of the encoder 10.

In these exemplary embodiments of the encoder 10 the accelerometer 61 generates the signal $si_1^{(1)}$ which is a response to acceleration $a_1^{(1)}$ in a direction in the point 60 of the encoder 10. The accelerometer 62 generates the signal $s_1^{(2)}$ which is a response to acceleration $a_1^{(2)}$ in a direction in the point 63 of the encoder 10. In exemplary embodiments of the encoder 10, the accelerometers 62 and 63 measure the accelerations in a same direction. In these exemplary embodiments, the processing device may analyze a differential signal which is a difference between the signals $si_1^{(1)}$ and $si_1^{(2)}$. In exemplary embodiments where the accelerometers 61 and 62 measure the accelerations in the same direction the accelerations $a_1^{(1)}$ and $a_1^{(2)}$ may be written as:

$$\begin{cases} a_1^{(1)} = \alpha_1 a_x^{(1)}(e_0, \gamma, t) + \alpha_2 a_y^{(1)}(e_0, \gamma, t) + \alpha_3 a_z^{(1)}(\gamma, t) + s_1(t) \\ a_1^{(2)} = \alpha_1 a_x^{(2)}(e_0, \gamma, t) + \alpha_2 a_y^{(2)}(e_0, \gamma, t) + \alpha_3 a_z^{(2)}(\gamma, t) + s_1(t) \end{cases}$$

If the equations for $a_1^{(1)}$ and $a_1^{(2)}$ are subtracted from each other the direct acceleration $s_1(t)$ disappears and an equation with two unknown parameters is left.

Consider an exemplary embodiment where $\alpha_1$ and/or $\alpha_2$ are close to 1 and $\alpha_3$ is close to 0. In these exemplary embodiments the accelerations $a_1^{(1)}$ and $a_1^{(2)}$ are measured in a plane parallel with the xy-plane. In these exemplary embodiments $\gamma$ is considered small.

The difference between the accelerations can be expressed as:

$$a_1^{(2)} - a_1^{(1)} = e_0 k \sin(\omega t + \beta) \quad (109)$$

where k and $\beta$ are known constants. Note that the direct accelerations $s_1(t)$ are cancelled out.

In these exemplary embodiments the processing device 65 is configured to determine a frequency spectrums $F_d$ for a differential signal $si_d$ where the differential signal is a difference between $si_1^{(1)}$ and $si_1^{(2)}$. The processing device 65 then fits the sinus term in the expression 109 to the differential signal $si_d$ based on the frequency spectrum $F_d$ for the signal. An amplitude $Am_1$ for a frequency components $F_{rd}$ in the frequency spectrums $F_d$ which corresponds to the first harmonic is determined for $si_d$ by the processing device 65.

The processing device 65 then determines $e_0$ as:

$$e_0 = \frac{1}{k} * Am_1$$

The direct acceleration $s_1(t)$ can be determined by the processing device 65 as:

$$s_1(t) = si_1^{(1)} - e_0 c \sin(\omega t + \delta)$$

where c and $\delta$ are known constants.

In other exemplary embodiments of the encoder 10 that include two accelerometers 61 and 62 the accelerations $a_1^{(1)}$ and $a_1^{(2)}$ are measured along an axis parallel with the z-axis. In these exemplary embodiments $\alpha_1$ and $\alpha_2$ are close to 0 and $\alpha_3$ is close to 1. The difference between the accelerations can be expressed as:

$$a_1^{(2)} - a_1^{(1)} = k_1 \gamma(\cos(\omega t + \phi^{(2)}) - \cos(\omega t + \phi^{(1)})) = k\gamma \sin(\omega t + \beta) \quad (110)$$

where $k_1$, k and $\beta$ are known constants.

In these exemplary embodiments, the processing device 65 is also configured to determine a frequency spectrum $F_d$ for a differential signal $si_d$ which is a difference between $s_1^{(1)}$ and $si_1^{(2)}$. The processing device 65 fits the sinus term in the expression 110 to the differential signal $si_d$ based on the frequency spectrum $F_d$ for the signal. An amplitude $Am_1$ for a frequency component $F_{rd}$ in the frequency spectrum $F_d$ which corresponds to the first harmonic is determined for $si_d$ by the processing device 65.

The processing device 65 then determines $\gamma$ as:

$$\gamma = \frac{1}{k} * Am1$$

The direct acceleration $s_1(t)$ can be determined by the processing device 65 as:

$$s_1(t) = si_1^{(1)} - \gamma c \cos(\omega t + \phi^{(1)})$$

where c is a known constant. In other exemplary embodiments the direct acceleration may be determined by the processing device 65 from the generalized expression:

$$s_1(t) = si_1^{(1)} - \gamma c_1 \sin(\omega t + \delta)$$

where $c_1$ and $\delta$ are known constants.

Other exemplary embodiments of the encoder 10 include two accelerometers 61 and 62 that each measures acceleration in two directions respectively. The accelerometer 61 measures accelerations $a_1^{(1)}$, $a_2^{(1)}$ and the accelerometer 62 measures accelerations $a_1^{(2)}$, $a_2^{(2)}$. The upper index denotes that the accelerations are measured in different positions of the encoder 10. In these exemplary embodiments of the encoder 10, the accelerometer 61 generates the signals $si_1^{(1)}$ and $si_2^{(1)}$ which are responses to accelerations $a_1^{(1)}$ and $a_2^{(1)}$ in two directions in the point 60 of the encoder 10. The accelerometer 62 generates the signals $s_1^{(2)}$, $si_2^{(2)}$ which are responses to accelerations $a_1^{(2)}$, $a_2^{(2)}$ in two directions in the point 63 of the encoder 10. In exemplary embodiments of the encoder 10, the accelerometers 62 and 63 measure the accelerations in the same directions. In these exemplary embodiments, the processing device 65 may analyze differential signals which are a difference between the signals $si_1^{(1)}$, $si_1^{(2)}$, and $si_2^{(1)}$, $si_2^{(2)}$ respectively. In exemplary embodiments where the accelerometers 61 and 62 measure the accelerations in the same directions, the accelerations $a_1^{(1)}$, $a_2^{(1)}$, $a_1^{(2)}$ and $a_2^{(2)}$ may be expressed as.

$$\begin{cases} a_1^{(1)} = \alpha_1 a_x^{(1)}(e_0, \gamma, t) + \alpha_2 a_y^{(1)}(e_0, \gamma, t) + \alpha_3 a_z^{(1)}(\gamma, t) + s_1(t) \\ a_1^{(2)} = \alpha_1 a_x^{(2)}(e_0, \gamma, t) + \alpha_2 a_y^{(2)}(e_0, \gamma, t) + \alpha_3 a_z^{(2)}(\gamma, t) + s_1(t) \\ a_2^{(1)} = \alpha_4 a_x^{(1)}(e_0, \gamma, t) + \alpha_5 a_y^{(1)}(e_0, \gamma, t) + \alpha_6 a_z^{(1)}(\gamma, t) + s_2(t) \\ a_2^{(2)} = \alpha_4 a_x^{(2)}(e_0, \gamma, t) + \alpha_5 a_y^{(2)}(e_0, \gamma, t) + \alpha_6 a_z^{(2)}(\gamma, t) + s_2(t) \end{cases}$$

The signals $si_1^{(1)}$, $si_2^{(1)}$, $si_1^{(2)}$ and $si_2^{(2)}$ may be analyzed differentially. If the equations for the respective direction are subtracted from each other, the direct accelerations $s_1(t)$, $s_2(t)$ disappear and a system with two equations and two unknown parameters is left. Both characteristic parameters $e_0$ and $\gamma$ can then be determined. The difference between the accelerations in the same direction can be expressed as:

$$\begin{cases} a_1^{(2)} - a_1^{(1)} = k_1 \sin(\omega t + \beta_1) \\ a_2^{(2)} - a_2^{(1)} = k_2 \sin(\omega t + \beta_2) \end{cases} \quad (111, 112)$$

where $k_1$, $k_2$, $\beta_1$ and $\beta_2$ are known functions of $e_0$ and $\gamma$.

In these exemplary embodiments, the processing device 65 are configured to determine frequency spectrums $F_{d1}$ and $F_{d2}$ for each of the differential signals $si_{d1}$ and $si_{d2}$ $si_{d1}$ is a difference between $si_1^{(1)}$ and $si_1^{(2)}$. $si_{d2}$ is a difference between $si_2^{(1)}$ and $si_2^{(2)}$. The processing device 65 fits the sinus term in the expression 111 to the differential signal $si_{d1}$ based on the frequency spectrum $F_{d1}$ for the signal $si_{d1}$. An amplitude $A_{md1}$ for a frequency components $F_{rd1}$ in the frequency spectrums $F_{d1}$ which corresponds to the first harmonic is determined for $si_{d1}$ by the processing device 65. The processing device 65 also fits the sinus term in the expression 112 to the differential signal $si_{d2}$ based on the frequency spectrum $F_{d2}$ for the signal $si_{d2}$. An amplitude $A_{md2}$ for a frequency components $F_{rd2}$ in the frequency spectrums $F_{d2}$ which corresponds the first harmonic is determined for $si_{d2}$ by the processing device 65.

The processing device 65 determines $e_0$ and $\gamma$ by solving the equation system:

$$\begin{cases} k_1(e_0, \gamma) = A_{md1} \\ k_2(e_0, \gamma) = A_{md2} \end{cases}$$

The direct acceleration $s_1(t)$ and $s_2(t)$ can be determined by the processing device 65 as:

$$\begin{cases} s_1 = si_1^{(1)} - c_1 \sin(\omega t + \delta_1) \\ s_2 = si_2^{(1)} - c_2 \sin(\omega t + \delta_2) \end{cases}$$

where $c_1$, $c_2$, $\delta_1$, $\delta_2$ are known functions of $e_0$ and $\gamma$.

Other exemplary embodiments of the encoder 10 include two accelerometers 61 and 62 that each measures acceleration in three directions respectively. The accelerometer 61 measures accelerations $a_1^{(1)}$, $a_2^{(1)}$ and $a_3^{(1)}$, the accelerometer 62 measures accelerations $a_1^{(2)}$, $a_2^{(2)}$ and $a_3^{(2)}$. The upper index denotes that the accelerations are measured in different positions of the encoder 10. In these exemplary embodiments of the encoder 10 the accelerometer 61 generates the signals $si_1^{(1)}$, $si_2^{(1)}$, and $si_3^{(1)}$ which are responses to accelerations $a_1^{(1)}$, $a_2^{(1)}$ and $a_3^{(1)}$ in three directions in the point 60 of the encoder 10. The accelerometer 62 generates the signals $si_1^{(2)}$, $si_2^{(2)}$ and $si_3^{(2)}$ which are responses to accelerations $a_1^{(2)}$, $a_2^{(2)}$ and $a_3^{(2)}$ in three directions in the point 63 of the encoder 10. In exemplary embodiments of the encoder 10, the accelerometers 62 and 63 measure the accelerations in the same directions. In these exemplary embodiments, the processing device may analyze differential signals which are a difference between the signals $si_1^{(1)}$, $si_1^{(2)}$, and $si_2^{(1)}$, $si_2^{(2)}$ and $si_3^{(1)}$, $si_3^{(2)}$ respectively. In exemplary embodiments where the accelerometers 61 and 62 measure the accelerations in the same directions, the accelerations $a_1^{(1)}$, $a_2^{(1)}$, $a_3^{(1)}$, $a_1^{(2)}$, $a_2^{(2)}$, and $a_3^{(2)}$ may be expressed as:

$$\begin{cases} a_1^{(1)} = \alpha_1 a_x^{(1)}(e_0, \gamma, t) + \alpha_2 a_y^{(1)}(e_0, \gamma, t) + \alpha_3 a_z^{(1)}(\gamma, t) + s_1(t) \\ a_1^{(2)} = \alpha_1 a_x^{(2)}(e_0, \gamma, t) + \alpha_2 a_y^{(2)}(e_0, \gamma, t) + \alpha_3 a_z^{(2)}(\gamma, t) + s_1(t) \\ a_2^{(1)} = \alpha_4 a_x^{(1)}(e_0, \gamma, t) + \alpha_5 a_y^{(1)}(e_0, \gamma, t) + \alpha_6 a_z^{(1)}(\gamma, t) + s_2(t) \\ a_2^{(2)} = \alpha_4 a_x^{(2)}(e_0, \gamma, t) + \alpha_5 a_y^{(2)}(e_0, \gamma, t) + \alpha_6 a_z^{(2)}(\gamma, t) + s_2(t) \\ a_3^{(1)} = \alpha_7 a_x^{(2)}(e_0, \gamma, t) + \alpha_8 a_y^{(2)}(e_0, \gamma, t) + \alpha_9 a_z^{(2)}(\gamma, t) + s_3(t) \\ a_3^{(2)} = \alpha_7 a_x^{(2)}(e_0, \gamma, t) + \alpha_8 a_y^{(2)}(e_0, \gamma, t) + \alpha_9 a_z^{(2)}(\gamma, t) + s3(t) \end{cases}$$

The signals $si_1^{(1)}$, $si_2^{(1)}$, $si_3^{(1)}$, $si_1^{(2)}$, $si_2^{(2)}$, and $si_3^{(2)}$ may be analyzed differentially. If the equations for the respective direction are subtracted from each other, the direct accelerations $s_1(t)$, $s_2(t)$ and $s_3(t)$ disappear and a system with two equations and two unknown parameters is left. Both characteristic parameters $e_0$ and $\gamma$ can then be determined. The difference between the accelerations in the respective direction can be expressed as:

$$\begin{cases} a_1^{(2)} - a_1^{(1)} = k_1\sin(\omega t + \beta_1) \\ a_2^{(2)} - a_2^{(1)} = k_2\sin(\omega t + \beta_2) \\ a_3^{(2)} - a_3^{(1)} = k_3\sin(\omega t + \beta_3) \end{cases} \quad (111, 112, 113)$$

where $k_1$, $k_2$, $k_3$, $\beta_1$, $\beta_2$ and $\beta_3$ are known functions of $e_0$ and $\gamma$.

In these exemplary embodiments the processing device 65 are configured to determine frequency spectrums $F_{d1}$, $F_{d2}$ and $F_{d3}$ for each of the differential signals $si_{d1}$, $si_{d2}$ and $si_{d3}$. A signal $si_{d1}$ is a difference between $s_1^{(1)}$ and $si_1^{(2)}$. A signal $si_{d2}$ is a difference between $si_2^{(1)}$ and $si_2^{(2)}$, and a signal $si_{d3}$ is a difference between the signals $si_3^{(1)}$ and $si_3^{(2)}$. The processing device 65 fits the sinus term in the expression 111 to the differential signal $si_{d1}$ based on the frequency spectrum $F_{d1}$ for the signal. An amplitude $A_{md1}$ for a frequency component $F_{rd1}$ in the frequency spectrum $F_{d1}$ which corresponds the first harmonic is determined for $si_{d1}$ by the processing device 65. The processing device 65 also fits the sinus term in the expression 112 to the differential signal $si_{d2}$ based on the frequency spectrum $F_{d2}$ for the signal $si_{d2}$. An amplitude $A_{md2}$ for a frequency component $F_{rd2}$ in the frequency spectrum $F_{d2}$ which corresponds to the first harmonic is determined for $si_{d2}$ by the processing device 65. The processing device 65 also fits the sinus term in the expression 113 to the differential signal $si_{d3}$ based on the frequency spectrum $F_{d3}$ for the signal $si_{d3}$. An amplitude $A_{md3}$ for a frequency component $F_{rd3}$ in the frequency spectrum $F_{d3}$ which corresponds to the first harmonic is determined for $si_{d3}$ by the processing device 65. The processing device 65 then determines $e_0$ and $\gamma$ by finding a solution to the equation system:

$$\begin{cases} k_1(e_0, \gamma) = A_{md1} \\ k_2(e_0, \gamma) = A_{md2} \\ k_3(e_0, \gamma) = A_{md3} \end{cases}$$

The direct accelerations $s_1(t)$, $s_2(t)$ and $s_3(t)$ can be determined by the processing device 65 as:

$$\begin{cases} s_1(t) = a_1^{(1)}(t) - c_1\sin(\omega t + \delta_1) \\ s_2(t) = a_2^{(1)}(t) - c_2\sin(\omega t + \delta_2) \\ s_3(t) = a_3^{(1)}(t) - c_3\sin(\omega t + \delta_3) \end{cases}$$

where $c_1$, $c_2$, $c_3$, $\delta_1$, $\delta_2$ and $\delta_3$ are known functions of $e_0$ and $\gamma$.

Other exemplary embodiments of the encoder 10 include two accelerometers that each measures accelerations in three directions respectively. In these exemplary embodiments, the accelerations are measured along the base vectors in a cylindrical coordinate system, defined by:

$$\begin{cases} x = \rho\cos\phi \\ y = \rho\sin\phi \\ z = z \end{cases}$$

Figure 3:
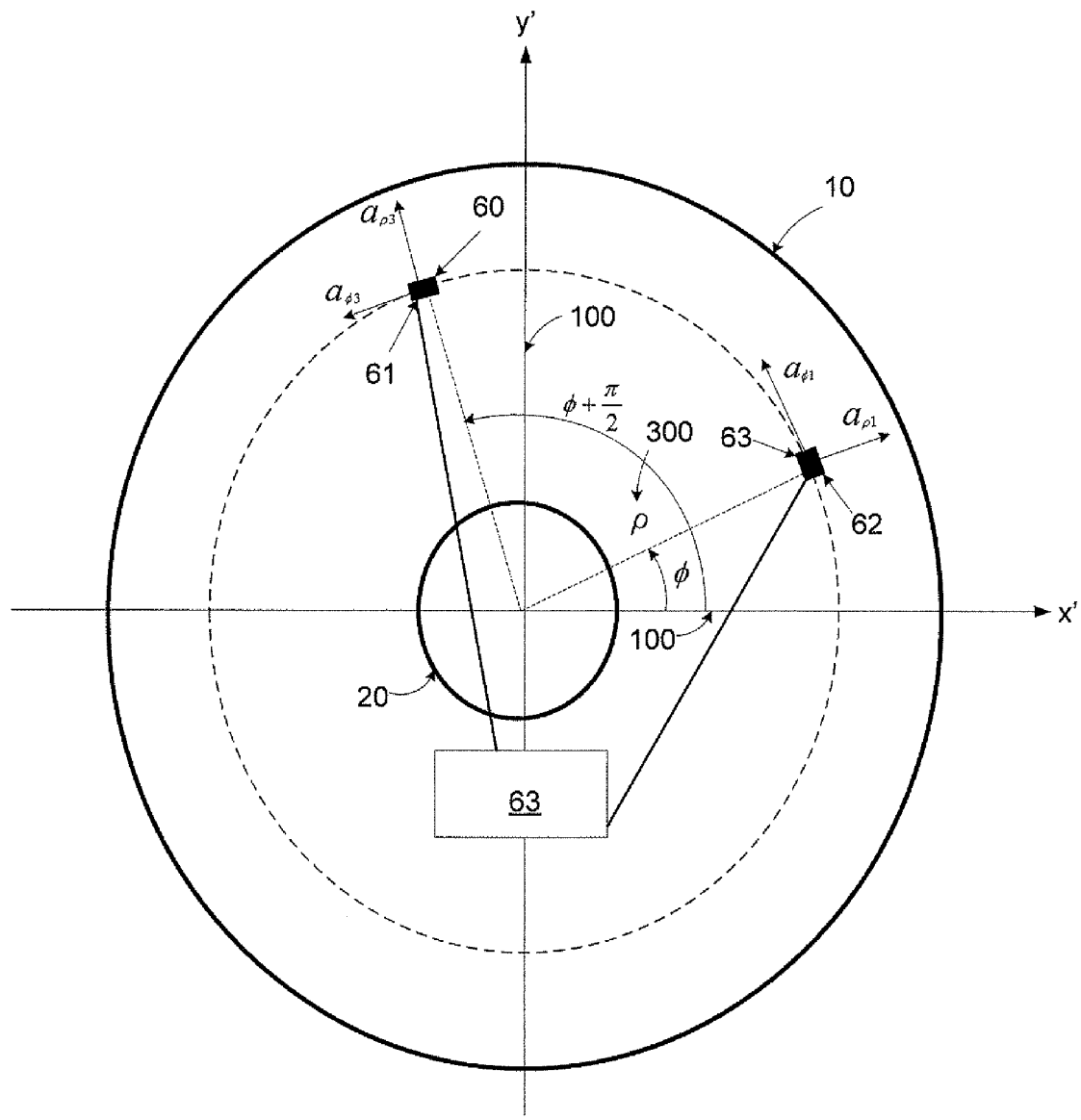
FIG. 3 schematically illustrates an encoder according to an example embodiment of the present invention.

FIG. 3 illustrates these exemplary embodiments of the encoder 10. The accelerometer 61 measures accelerations $a_{\rho3}$, $a_{\phi3}$ and $a_{z3}$. The accelerometer 62 measures accelerations $a_{\rho1}$, $a_{\phi1}$ and $a_{z1}$. In these exemplary embodiments of the encoder 10, the accelerometer 61 generates the signals $si_{\rho3}$, $si_{\phi3}$ and $Si_{z3}$ which are responses to accelerations $a_{\rho3}$, $a_{\phi3}$ and $a_{z3}$ along the base vectors in the point 60 of the encoder 10. The accelerometer 62 generates the signals $si_{\rho1}$, $si_{\phi1}$ and $si_{z1}$ which are responses to accelerations $a_{\rho1}$, $a_{\phi1}$ and $a_{z1}$ along the base vectors in the point 63 of the encoder 10.

In the exemplary embodiments illustrated in FIG. 3, the accelerometers 61 and 62 are placed at a same radius 300 and at a distance of a quarter of a turn. An advantage with these positions is that the amplitude of the differential signals in the xy-plane becomes independent of $\phi$.

Another advantage compared to other positions is that all three differential signals can be used and that they all have the same order of magnitude in response to the wobbling axis and the eccentricity of the axis. Yet another advantage is that $\phi$ only influences the differential signal in the z-direction and that it is only the phase that is affected.

This means that the only customer specific parameters that are needed to calculate $e_0$ and $\gamma$ is the parameter h, the distance from the center 90 of the rotary encoder to the point 50 where the torque arm 40 is attached to the encoder.

In these exemplary embodiments, the processing device 65 may also analyze differential signals. In exemplary embodiments, the processing device 65 analyzes a differential signal $si_{d1}$ which is a difference between the signals $si_{\rho1}$ and $si_{\phi3}$ a differential signal $si_{d2}$ which is a difference between the signals $si_{\phi1}$ and $si_{\rho3}$, and a differential signal $si_{d3}$ which is a difference between the signals $si_{z1}$ and $si_{z3}$. In these exemplary embodiments, the accelerations for the differential signals can be expressed as:

$$\begin{cases} a_{\rho1} + a_{\phi3} = -\dfrac{e_0\omega^2\rho}{h}\sin(\omega t + \delta_1) \\ a_{\phi1} + a_{\rho3} = -\dfrac{e_0\omega^2\rho}{h}\sin(\omega t + \delta_1) \\ a_{z1} + a_{z3} = \sqrt{2}\,\gamma\omega^2\rho\sin\left(\omega t + \phi + \dfrac{\pi}{4}\right) \end{cases} \quad (114, 115, 116)$$

In these exemplary embodiments, the processing device 65 is also configured to determine frequency spectrums $F_{d1}$, $F_{d2}$ and $F_{d3}$ for each of the differential signals $si_{d1}$, $si_{d2}$ and $si_{d3}$. The processing device 65 fits the sinus term in the expression 114 to the differential signal $si_{d1}$ based on the frequency spectrum $F_{d1}$ for the signal. An amplitude $A_{md1}$ for a frequency components $F_{rd1}$ in the frequency spectrums $F_{d1}$ which corresponds the first harmonic is determined for $si_{d1}$ by the processing device 65. The processing device 65 also fits the sinus term in the expression 115 to the differential signal $si_{d2}$ based on the frequency spectrum $F_{d2}$ for the signal $si_{d2}$. An amplitude $A_{md2}$ for a frequency component $F_{rd2}$ in the frequency spectrum $F_{d2}$ which corresponds to the first harmonic is determined for $si_{d2}$ by the processing device 65. The processing device 65 also fits the sinus term in the expression 116 to the differential signal $si_{d3}$ based on the frequency spectrum $F_{d3}$ for the signal $si_{d3}$. An amplitude $A_{md3}$ for a frequency component $F_{rd3}$ in the frequency spectrum $F_{d3}$ which corresponds to the first harmonic is determined for $si_{d3}$ by the processing device 65.

The processing device 65 determines $e_0$ and $\gamma$ by solving the equation system $$\begin{cases} Am_1 = e_0 k_1 \\ Am_1 = e_0 k_2 \\ Am_3 = \gamma k_3 \end{cases}$$

where $$k_1 = k_2 = \frac{\omega^2 \rho}{h},$$
$$k_3 = \sqrt{2}\,\omega^2 \rho$$

In these exemplary embodiments, the method of least squares yields:

$$e_0 = \frac{Am_1 + Am_2}{2k_1}$$
$$\gamma = \frac{Am_3}{k_3}$$

The direct accelerations $s_{\rho 1}(t)$, $s_{\phi 1}(t)$ and $s_z(t)$ can be determined by the processing device 65 by using all known parameters in equation 117 and compare with the signals from the accelerometers. The accelerations generated by the eccentric and wobbling axis can then be subtracted and the processing device can perform further analysis of the direct accelerations.

$$\begin{cases} s_{\rho 1}(t) = si_{\rho 1} + (e_0 - \gamma g)\omega^2 \cos(\omega t - \phi_1) \\ s_{\phi 1}(t) = si_{\phi 1} + \frac{e_0 \omega^2 \rho}{h}\sin\omega t - (e_0 - \gamma g)\omega^2 \sin(\omega t - \phi_1) \\ s_z(t) = si_{z1} - \gamma \omega^2 \rho \cos(\omega t + \phi_1) \end{cases} \quad (117)$$

where $s_{\rho 1} = -s_{\phi 2}$ and $s_{\phi 1} = s_{\rho 2}$

The direct accelerations can be written in the generalized form:

$$\begin{cases} s_{\rho 1}(t) = si_{\rho 1} - c_1 \sin(\omega t + \beta_1) \\ s_{\phi 1}(t) = si_{\phi 1} - c_2 \sin(\omega t + \beta_2) \\ s_{z1}(t) = si_{z1} - c_3 \sin(\omega t + \beta_3) \end{cases}$$

where $c_1 = -(e_0 - \gamma g)\omega^2$ $c_2 = \sqrt{\left(\frac{e_0 \omega^2 \rho}{h}\right)^2 + ((e_0 - \gamma g)\omega^2) + 2\frac{e_0 \omega^2 \rho}{h}(e_0 - \gamma g)\omega^2 \cos\phi_1}$ $c_3 = \gamma \omega^2 \rho$ $\beta_1 = \frac{\pi}{2} - \phi_1$ $\beta_2 = \arctan\left(\frac{-(e_0 - \gamma g)\sin\phi_1}{\frac{e_0 \rho}{h} + (e_0 - \gamma g)\cos\phi_1}\right) + \begin{cases} 0 & \text{om } \frac{e_0 \rho}{h} + (e_0 - \gamma g)\cos\phi_1 \geq 0 \\ \pi & \text{om } \frac{e_0 \rho}{h} + (e_0 - \gamma g)\cos\phi_1 < 0 \end{cases}$ $\beta_3 = \frac{\pi}{2} + \phi_1$ In yet another exemplary embodiment of the encoder 10, one or several accelerometers can be used to detect a play in the torque arm 40 (FIG. 1). Since a play in the torque arm 40 results in a turning motion without any radial component it is appropriate to use an accelerometer that measures acceleration along the tangential direction in a cylindrical coordinate system. FIG. 3 illustrates an exemplary embodiment of the encoder 10 that can be used to detect a play in the torque arm 40 (FIG. 1).

The accelerometer 62 measures accelerations $a_{\rho 1}$, $a_{\phi 1}$ and $a_{z1}$. In an exemplary embodiment of the encoder 10, which will be described below, it is however only necessary to use an accelerometer that measures the acceleration $a_{\phi 1}$. In this exemplary embodiment of the encoder 10, the accelerometer 62 generates the signal $si_{\phi 1}$ which is the response to the acceleration $a_{\phi 1}$ along the tangential vector in the point 63 of the encoder 10.

In this exemplary embodiment, the accelerations for the signal $si_{\phi 1}$ can be expressed according to equation 118 below. The play in the torque arm is added to the equation 118 by adding an extra acceleration term ($\delta(t)$), $\delta$ appears as acceleration peaks if there is a play in the torque arm 40.

$$\left\{ a_\phi = -\frac{e_0 \omega^2 \rho}{h}\sin\omega t - (e_0 - \gamma g)\omega^2 \sin(\omega t - \phi) + s_\phi(\phi, t) + \delta(t) \right. \quad 118$$

In this exemplary embodiment, the processing device 65 is configured to determine a frequency spectrum $F_{sif1}$ for the signal $si_{\phi 1}$, in which the amplitude of the harmonic corresponding to one cycle per revolution is called $A_m$. In this exemplary embodiment, the processing device 65 is also configured to determine the peak to peak value of the signal $si_{\phi 1}$ (i.e. max-min). In an exemplary embodiment of the encoder 10, the processing device 65 determines a ratio between half of the peak to peak value for $si_{\phi 1}$ and the one periodic amplitude $A_m$ for the signal $si_{\phi 1}$. If this ratio exceeds a certain value the processing device 65 determines that there is a play in the torque arm 40. If the rotation is slow or if the axis 20 is not wobbling enough the amplitude $A_m$ becomes small but noise and distortion may be large. The ratio can then become large even though there is no play in the torque arm 40. In another embodiment of the encoder 10, the processing device 65 may therefore use further criteria to determine that there is a play in the torque arm 40. The processing device 65 may for instance determine that there is a play in the torque arm 40 if the described ratio is larger than a certain value if at the same time as the peak to peak value of $si_{\phi 1}$ is larger than another predetermined value.

Figure 2:
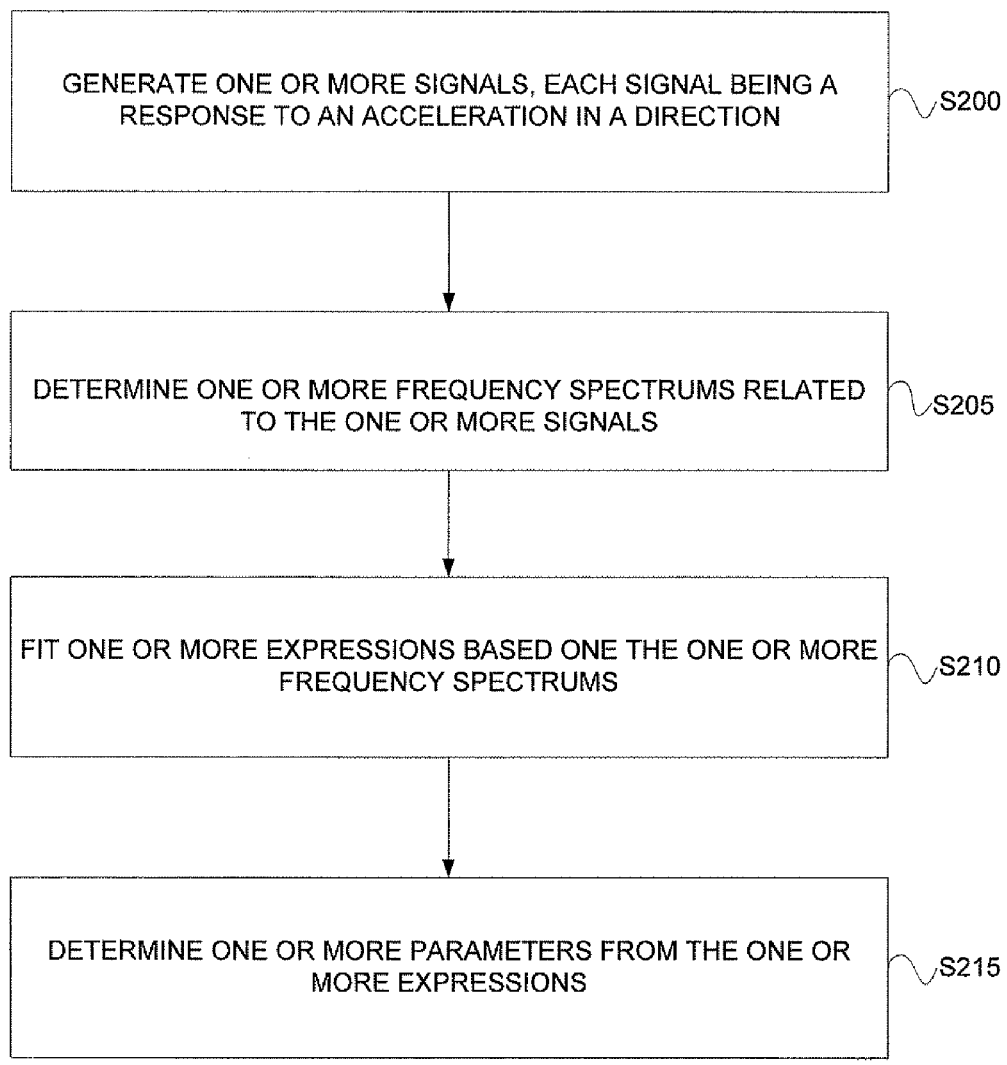
FIG. 2 is a flow diagram of a method according to an example embodiment of the present invention.

Referring to FIG. 2 there is illustrated a flowchart of a method describing the steps for determining one or more parameters, in accordance with previously described example embodiments. As shown in FIG. 2, the method includes:

generating (S200) one or more signals, each signal being a response to an acceleration in a direction in a point of the encoder;

determining (S205) one or more frequency spectrums related to the one or more signals;

fitting (S210) one or more expressions related to the one or more signals based on the one or more frequency spectrums, where each expression describes an acceleration related to the one or more direction and the one or more points of the encoder; and determining (S215) one or more parameters from the one or more expressions, where each parameter is related to a type of vibration for the encoder.

The devices mentioned above can arranged as software, hardware, or a combination of both. The described subject matter is of course not limited to the example embodiments described above and shown in the drawings.

What is claimed is:

1. A method for determining at least one parameter related to a type of vibration for an encoder mounted on an axis and arranged to detect rotary movement of the axis, an element fixed at the encoder arranged to prevent the encoder from rotating with the axis, comprising:
generating at least one signal in response to an acceleration in a direction in a point of the encoder;
determining at least one frequency spectrum related to the signal;
fitting at least one expression related to the signal based on the frequency spectrum, each expression describing an acceleration related to the direction and the point of the encoder; and
determining at least one parameter from the expression, each parameter related to a type of vibration for the encoder.

2. The method according to claim 1, wherein the frequency spectrum determination includes determining the frequency spectrum for each signal, and wherein the fitting includes fitting an expression to each signal based on each of the frequency spectra, each expression describing the acceleration in the direction in the point of the encoder.

3. The method according to claim 2, further comprising, after the determining, subtracting each vibration using a respective parameter from a respective signal to obtain a direct acceleration in each direction for the encoder.

4. The method according to claim 1, wherein the frequency spectrum determination includes determining each frequency spectrum for a differential signal, the differential signal being a difference between a first signal being a response to a first acceleration in a first direction in a first point of the encoder and a second signal being a response to a second acceleration in the first direction in a second point of the encoder, the fitting including fitting an expression to each differential signal, each expression describing a difference between the first acceleration in the first direction in the first point of the encoder and the second acceleration in the first direction in the second point of the encoder.

5. The method according to claim 4, further comprising, after the determining, subtracting each vibration using a respective parameter from each respective signal to obtain a direct acceleration in each respective direction for the encoder.

6. An encoder for determining at least one parameter related to a type of vibration for an encoder mounted on an axis and configured to detect rotary movement of the axis, an element fixed at the encoder adapted to prevent the encoder from rotating with the axis, comprising:
at least one accelerometer adapted to generate at least one signals, each signal being a response to an acceleration in a direction in a point of the encoder;
a processing device adapted to determine at least one frequency spectrum related to the signal, the processing adapted to fit at least one expression related to the signal based on the frequency spectrum, each expression describing an acceleration related to the direction and the point of the encoder, the processing device adapted to determine at least one parameter from the expression, each parameter being related to a type of vibration for the encoder.

7. The encoded according to claim 6, wherein the processing device is configured to determine the frequency spectrum for each signal and to fit an expression to each signal based on each frequency spectrum, each expression describing the acceleration in the direction in the point of the encoder.

8. The encoder according to claim 7, wherein the processing device is configured to subtract each vibration using a respective parameter from each respective signal to obtain a direct acceleration in each of respective direction for the encoder.

9. The encoder according to claim 7, wherein the processing device is configured to determine the frequency spectrum for a differential signal, the differential signal being a difference between a first signal being a response to a first acceleration in a first direction in a first point of the encoder and a second signal being a response to a second acceleration in the first direction in a second point of the encoder, the processing device adapted to fit an expression to each differential signals, each expression describing a difference between the first acceleration in the first direction in the first point of the encoder and the second acceleration in the first direction in the second point of the encoder.

10. The encoder according to claim 9, wherein processing device is configured to subtract each vibration using a respective parameter from each respective signal to obtain a direct acceleration in each respective direction for the encoder.

* * * * *